United States Patent [19]
Nomura et al.

[11] Patent Number: 5,788,732
[45] Date of Patent: Aug. 4, 1998

[54] OPTICAL-DEVICE FORMING METHOD AND APPARATUS

[75] Inventors: Takeshi Nomura, Yokohama; Nobuyuki Nakagawa, Kawasaki; Kiyoshi Yamamoto; Sunao Miyazaki, both of Yokohama, all of Japan

[73] Assignee: Canon Kabushiki Kaisha, Tokyo, Japan

[21] Appl. No.: 634,256

[22] Filed: Apr. 18, 1996

[30] Foreign Application Priority Data

Apr. 20, 1995 [JP] Japan .................................. 7-095200
Mar. 25, 1996 [JP] Japan .................................. 8-068741

[51] Int. Cl.⁶ .................................................. C03B 11/00
[52] U.S. Cl. .................... 65/64; 65/102; 65/260; 65/286; 65/305; 65/323; 425/808; 264/1.1
[58] Field of Search .......................... 65/64, 102, 66, 65/111, 260, 268, 286, 275, 269, 305, 323; 425/808; 264/1.1, 1.31, 1.32

[56] References Cited

U.S. PATENT DOCUMENTS

| | | | |
|---|---|---|---|
| 3,459,526 | 8/1969 | Stickel et al. | 65/305 |
| 3,960,535 | 6/1976 | Hamilton et al. | 65/275 |
| 5,092,916 | 3/1992 | McMaster | 65/323 |
| 5,160,362 | 11/1992 | Yamamoto et al. | 65/102 |
| 5,215,566 | 6/1993 | Yamamoto et al. | 65/29 |
| 5,228,894 | 7/1993 | Sato et al. | 65/102 |
| 5,230,728 | 7/1993 | McMaster | 65/323 |
| 5,378,255 | 1/1995 | Ito | 65/64 |
| 5,417,730 | 5/1995 | Shigyo et al. | 65/111 |
| 5,435,818 | 7/1995 | Mashige et al. | 65/29.12 |

FOREIGN PATENT DOCUMENTS

| | | | |
|---|---|---|---|
| 60-118641 | 6/1985 | Japan | 65/260 |
| 64-24029 | 1/1989 | Japan | 65/64 |
| 4130024 | 5/1992 | Japan | |
| 4-338120 | 11/1992 | Japan | 65/260 |

*Primary Examiner*—Steven P. Griffin
*Attorney, Agent, or Firm*—Fitzpatrick, Cella, Harper & Scinto

[57] ABSTRACT

A method and apparatus for forming an optical device of a desired shape presses a heat-softened optical material using a set of molds. The optical material is aligned with respect to the molds by two or more aligning members which move around the center of the mold relative to each other. The optical material may also be aligned by inserting a pin into an aligning hole which is fixed to the mold body and has been aligned with respect to the molds.

50 Claims, 32 Drawing Sheets

OPTICAL-DEVICE FORMING METHOD AND APPARATUS

BACKGROUND OF THE INVENTION

This invention relates to an optical-device forming method and apparatus and, more particularly to an optical-device forming method and apparatus by press-molding heat-softened optical material to obtain an optical device such as a lens blank, an optical lens and a prism.

DESCRIPTION OF RELATED ART

Recently, optical systems for cameras and video cameras use aspherical-surface lenses, which contributes to downsizing and reduction in cost of the optical systems. A known method for efficiently producing the aspherical-surface lenses is putting a material between molds having predetermined surface precision and press-molding a lens. However, as lenses used for optical systems must be produced with relatively high precision, the possible shapes and sizes of lenses are limited, accordingly, possible shapes and sizes are being developed. Regarding lenses of shapes which can be formed with the present technologies, further reduction of cost is being studied.

In the conventional art, production of high-precision products such as lenses, directly from glass material such as molten glass, has not been made. However, a need for the above products has increased because of the cost-reduction requirement.

Further, regarding lens shapes, concave lenses as well as convex lenses and lenses having large diameters have been increasingly needed.

Upon formation of the high-precision lens shapes, it is important to consider the positional precision between the glass material which is placed on a lower mold and the lower mold, prior to press-molding, i.e., the precision of the position at which the glass material is placed before molding. For example, if the positional precision of the material is bad, the material is molded at a shifted press-molding position, which causes lack of molding material to be supplied at a transfer surface of a lens. To prevent this inconvenience, the amount of the material must be greater than a necessary amount. Further, the shift-molded product has an unstable shape, which disturbs handling of the product such as taking the product out of the molds.

As a method to improve the positional precision when placing molding material such as glass material on a mold, Japanese Patent Application Laid-Open No. 4-130024 discloses supplying a material to a mold by using a vacuum chuck, where this suction member as a material supplying device has a position-aligning mechanism. According to this method, substantial alignment of the material and the mold is made by aligning the positions of the vacuum chuck and the material.

In the conventional art, production of high-precision products such as lenses, directly from glass material, has not been made. However, a need for the above products has increased because of the cost-reduction requirement. Regarding the shapes of lenses, concave lenses as well as convex lenses, and lenses having a large diameter are needed.

Upon formation of these lenses, the positional precision between glass material placed on a lower mold and the lower mold, before press-molding, must be considered. However, high-precision alignment of the positions of the material and the mold has not been made since there was not so much need for these lenses.

However, the uses of aspherical-surface lenses has increased more and more, and the number of different shapes of these lenses have increased, e.g., from only the easily-formable convex lenses to lenses of other shapes including concave lenses with difficulty to precisely form their optical-function surface.

Regarding the formation of concave lenses being in increasing demand, especially for double-concave surfaced lenses, a glass material must be placed on a convex shaped lower mold. If the material is placed on a shifted position, the molding is made at the risk of the material falling. Further, different from convex lenses, concave lenses have a thicker peripheral portion, that does not receive pressure as well as the central portion. If the peripheral portion is not fully pressed, the portion is deformed, accordingly, the function surface shape cannot be transferred as expected. Furthermore, if the position of the material is shifted by only a slight amount and the transfer area of the product lens is reduced, the probability of manufacturing inferior products increases. To prevent this inconvenience, the amount of the glass material may be larger than a necessary amount, however, since concave lenses have a thick peripheral portion, the increase in amount is significantly great for only a small amount of shift. This increases costs and technical load.

Upon forming a preform, if the positional precision is poor, the center of the curvature of the molded surface and the center from the peripheral portion are shifted. Consequently if this preform is used for forming a lens, the positions of the lens blank and the mold cannot be aligned with precision, which causes inconveniences as above. That is, even a lens blank must be precisely formed.

In other than concave lenses, glass material can be used to greatly reduce the costs. Although the glass materials have conventionally been adjusted in shape and weight by grinding, recently, glass materials are directly formed from molten glass (precise preform). In the latter case, in comparison with the grind-adjusted materials, the variation in shape and weight is larger. Pursuit of decreasing the variation lowers the yield in material production process, thus further increases the costs.

If a convex lens is formed at a shifted position, its peripheral portion increases, which often causes breakage of the lens. Besides the lens shape, the product molded at the shifted position has an unstable shape, the probability of errors in handling such as taking out of the lens from the mold becomes higher. This also is a hindrance to automated molding.

As described above, higher precision for aligning the material and an aligning method which can cope with the variation in shapes of the materials are required.

In Japanese Patent Application Laid-Open No. 4-130024, though the aligning mechanism is provided to the suction member, there is no detailed description of the aligning method. According to the embodiment, at the same time of supplying the glass material from the suction member to the lower mold, aligning guide is opened to guide the glass material. This describes the positional relation between the glass material and the mold, before the glass material is supplied from the suction member is described, however, it does not describe the alignment of the position of the glass material after it has fallen from the suction member onto the mold. Further, even if the position of the glass material is aligned after it has placed on the mold, the construction of the embodiment cannot perform precise position alignment corresponding to the variation in measurements of the glass materials.

SUMMARY OF THE INVENTION

The present invention has been made in consideration of the above situation, and has its object to provide an optical-device forming method and apparatus capable of precise alignment of a glass material with a mold even if the glass materials vary in the size and amount, or the size or amount of the material is changed.

Further, another object of the present invention is to provide an optical-device forming method and apparatus capable of alignment with higher precision, and attains easy exchange of molds, thus improving maintainability.

Further, another object of the present invention is to provide an optical-device forming method and apparatus capable of precise alignment of a glass material with a mold, even if an aligning member and the mold are separately provided.

Further, another object of the present invention is to provide an optical-device forming method and apparatus capable of precise alignment of glass materials having a variety of sizes with a mold, by using an aligning member having a compact structure.

Further, another object of the present invention is to provide an optical-device forming method and apparatus which prevents shifting of positional relation between a mold and an aligning device, which has been adjusted at around room temperature in advance, upon heating these members, with a glass material placed on the mold, due to different thermal expansion rates.

Further, another object of the present invention is to provide an optical-device forming method and apparatus capable of aligning a glass material which is placed on a heated mold; the positional relation between the mold and an aligning member, which have been adjusted at around room temperature, are prevented from shifting upon heating the mold, due to the difference of thermal expansion between these members.

Further, another object of the present invention is to provide an optical-device forming method and apparatus capable of effective alignment of a glass material based on the viscosity of the glass material.

Further, another object of the present invention is to provide an optical-device forming method and apparatus capable of simultaneous alignment of a plurality of glass materials for simultaneous molding of the materials.

According to the present invention, the foregoing objects are attained by providing an optical-device forming method for forming an optical device of a desired shape by pressing a heat-softened optical material using a set of molds, comprising the step of performing alignment of the optical material with respect to the mold, by moving the optical material within the mold to a predetermined position by abutting against the optical material.

Further, the foregoing objects are attained by providing an optical-device forming method for forming a concave optical-functional surface on at least one surface of an optical material by pressing the optical material, being heat-softened, using a pair of molds, one having a concave surface for transferring the optical-functional surface as a stationary mold and the other having a convex surface as a movable mold, comprising the steps of: placing the optical material on the movable mold; aligning the optical material with respect to the movable mold; and pressing the optical material by the pair of molds to transfer the concave optical-functional surface on at least one surface of the optical material.

Further, the foregoing objects are attained by providing an optical-device forming apparatus for forming an optical device of a desired shape by pressing a heat-softened optical material using a pair of molds, comprising aligning means for aligning the optical material with respect to the mold, by moving the optical material within the mold to a predetermined position by abutting against the optical material.

Further, the foregoing objects are attained by providing an optical-device forming apparatus for forming a plurality of optical devices of a desired shape by pressing a plurality of heat-softened optical material using plural pairs of molds, comprising aligning means for approximately simultaneously performing alignment of the optical materials with respect to the molds, by moving the optical materials within the molds to a predetermined position by abutting against the optical materials.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<Press-Molding Apparatus>

First, the structure of a press-molding apparatus to which the present invention is applied will be described.

Figure 1:
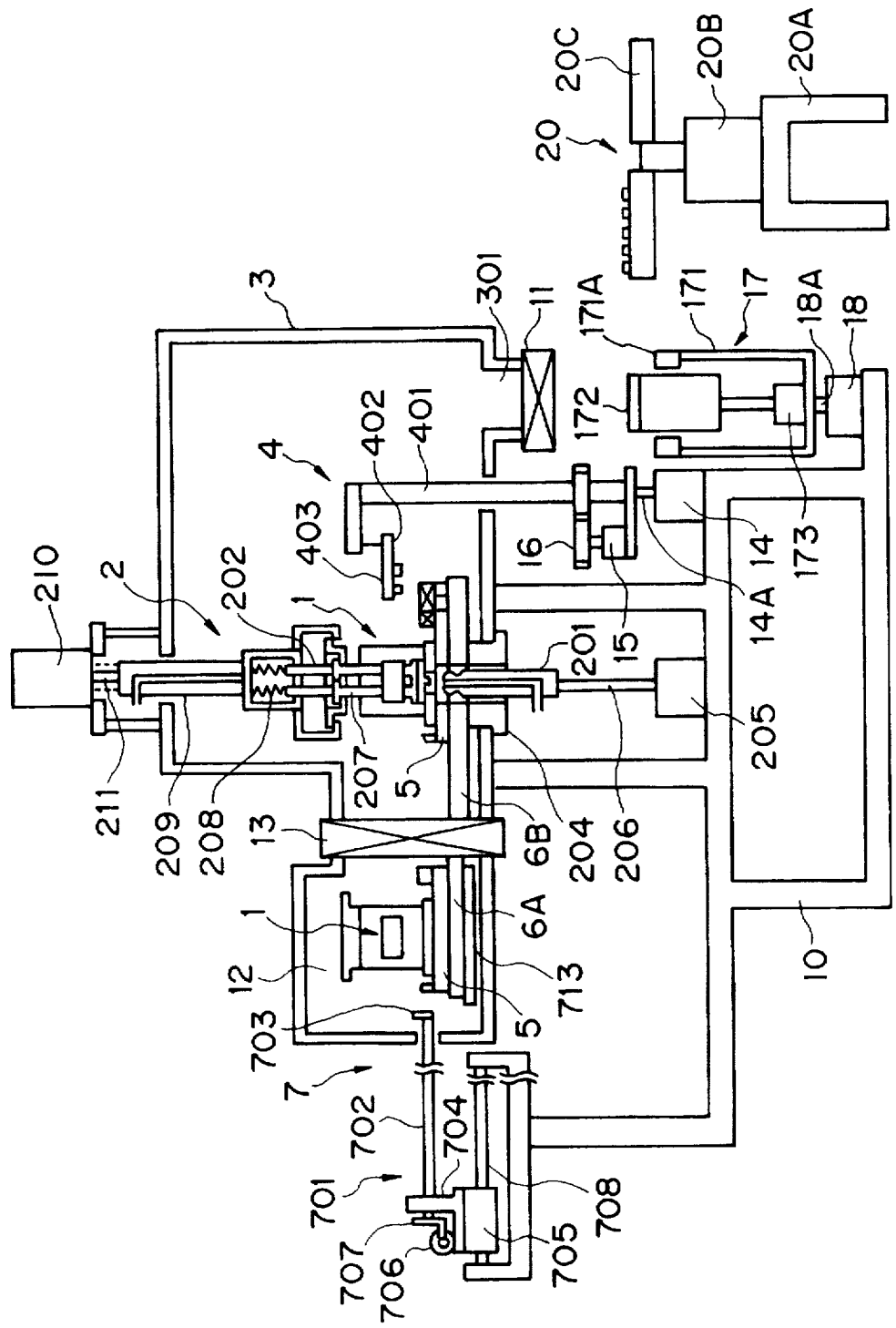
FIG. 1 is an elevational sectional view schematically showing a press-molding apparatus to which the present invention is applied.
Figure 2:
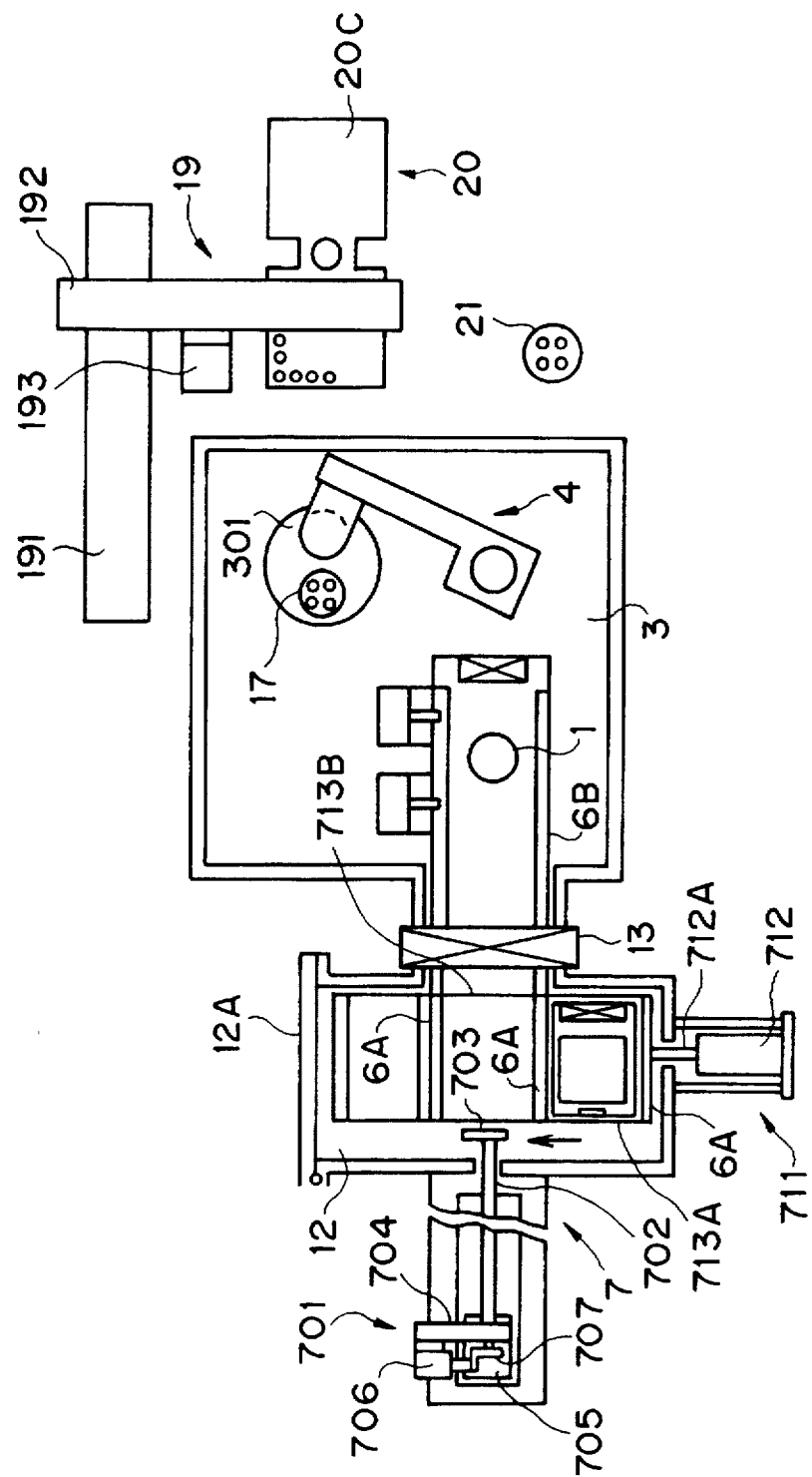
FIG. 2 is a horizontal sectional view schematically showing the press-molding apparatus.

FIG. 1 is an elevational sectional view schematically showing a press-molding apparatus to which the present invention is applied. FIG. 2 is a horizontal sectional view schematically showing the press-molding apparatus.

In FIGS. 1 and 2, the press-molding apparatus performs press-molding by setting a glass material (lens blank) into a mold 1 and moving an movable portion (to be described later) of the mold 1 by a press-operating mechanism 2. Preferably, this press-molding is performed in inactive-gas atmosphere such as nitrogenous atmosphere. The mold 1, the press-operating mechanism 2 and the like are provided within an airtight molding chamber 3. Note that the "lens blank" is a glass material pre-formed close to a completed molded form.

Figure 3:
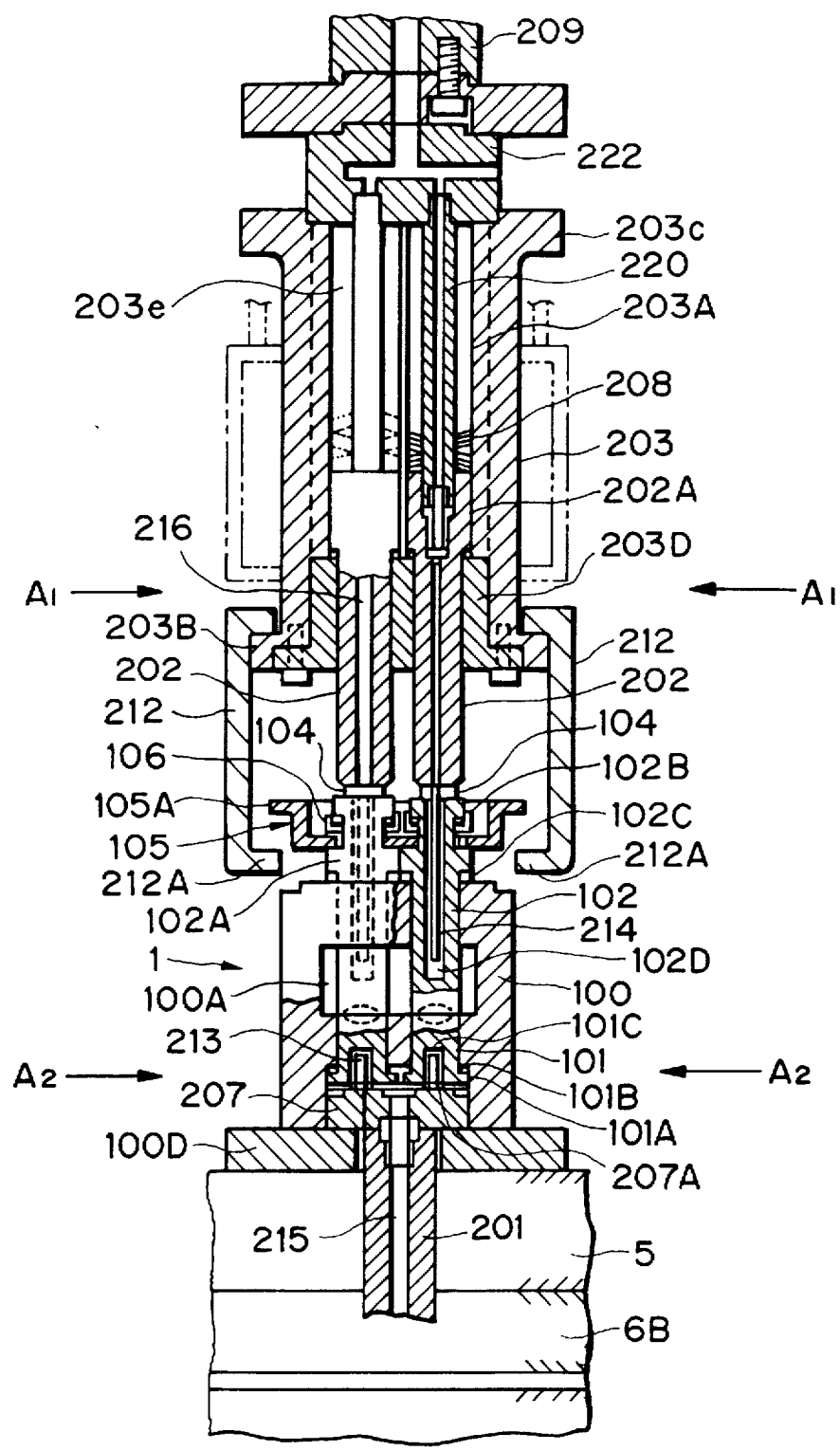
FIG. 3 is a cross-sectional view showing a significant part of a mold device used in the press-molding apparatus.

As shown in FIGS. 1 to FIG. 3, the press-operating mechanism 2 has an operating member 201 for thrust-up operation on the lower side of a guide rail 6B, at a press-molding position, and four press rods 202 corresponding to respective upper mold members 102, at the upper portion of the mold 1. The press-operating mechanism 2 holds these members with a holder block 203. The operating member 201 inserts its upper end into the molding chamber 3 from the outside via a ring member 204 provided at the bottom of the molding chamber 3. Also, the lower end of the operating member 201 is connected to a piston rod 206 extending upward from a cylinder mechanism 205 for thrust-up operation. Further, at the upper end of the operating member 201, a thrust-up piece 207 connected to a lower mold 101 is provided. The thrust-up member 207 slides with respect to a mold body 100 to commonly thrust the lower mold 101.

The molding chamber 3 is provided on a platform 10. The molding chamber 3 has a gate valve 11 at an entrance/exit 301 for feeding glass materials and discharging products, and the chamber 3 is connected to an external part via this gate valve 11. On the platform 10, a mold exchange chamber 12 is provided adjacent to the molding chamber 3. The mold exchange chamber 12 is connected to the molding chamber 3 via a gate valve 13.

In the molding chamber 3, an exchange mechanism 4 for introducing glass materials to the mold 1 and discharging product is provided. The exchange mechanism 4 is constructed by attaching a sucking hand 402 as a material/product carrying mechanism to the upper end of a rotating shaft 401 which is vertically introduced into the molding chamber 3 from the outside, and attaching a sucking pad 403 to the end of the sucking hand 402. The rotating shaft 401 is rotatably connected to a piston rod 14A of a cylinder mechanism 14 provided on the platform 10. The rotating shaft 401 is moved upward and downward along its axial direction by the operation of the piton rod 14A, and is rotated by an electric motor 15 provided at the piston rod 14A via a gear 16.

In the above structure, while the sucking pad 403 suck-holds the glass materials, the sucking pad 403 is introduced into the mold 1 by the up/down movement and rotation of the rotating shaft 401 based on the control of the cylinder mechanism 14 and the rotation control of the electric motor 15. Then, while the sucking pad 403 still suck-holds the products, the sucking pad 403 is carried out of the mold 1 by up/down movement and rotation of the rotating shaft 401, reverse to those upon introduction of the sucking pad 403.

On the platform 10, a feed/discharge mechanism 17, for carrying glass materials in and discharging products from the molding chamber 3, is provided below the entrance/exit 301. The feed/discharge mechanism 17 has an exchange chamber 171 on a piston rod 18A expanding upward from a cylinder mechanism 18, and a feed/discharge plate 172 to be moved into/out of the exchange chamber 171 from an opening 171A, provided at the upper end of the exchange mechanism 171, in upward/downward direction. The feed/discharge plate 172 is moved upward/downward by an elevator mechanism (e.g., a piston cylinder mechanism) 173 provided within the exchange chamber 171.

In this structure, when the glass material is fed into the molding chamber 3 or the product is taken out from the molding chamber 3, the piston rod 18A is moved upward under the control of the cylinder mechanism 18 while the glass material is placed on the feeding feed/discharge plate 172, and the exchange chamber 171 is moved upward to bring the opening 171A into airtight contact with the gate valve 11.

In this state, the atmosphere within the exchange chamber 171 is exchanged with predetermined atmosphere, the gate valve 11 is opened to connect the molding chamber 3 with the exchange chamber 171, further, the elevator mechanism 173 introduces the feed/discharge plate 172 into the molding chamber 3, thus carries the glass material to the exchange mechanism 4 and receives the product from the exchange mechanism 4. Thereafter, the elevator mechanism 173 is moved downward to return the feed/discharge plate 172 to the exchange chamber 171, and to close the gate valve, then the exchange chamber 171 is moved downward by the operation of the cylinder mechanism, for picking up the product from the feed/discharge plate 172 and placing a new glass material onto the feed/discharge plate 172.

In this apparatus, the placement of the new glass material and pickup of the product is performed by using a robot 19 (See FIG. 2). The robot 19 places a glass material from a stock tray 20 onto the feed/discharge plate 172, and moves a product from the feed/discharge plate 172 to a predetermined place, by using a sucking mechanism or the like. That is, the robot 19 has an X-axis arm 191 and a Y-axis arm 192 and it moves a sucking hand 193 provided at the Y-axis arm 192 in X- and Y-axis directions by the operation of these arms 191 and 192. In the stock tray 20, an electric motor 20B is provided on a frame 20A, and a palette 20C is fixed to the rotating shaft of the electric motor 20B. The palette 20C is rotated by the driving force of the electric motor 20B, thus the reception of the product and the placement of the new glass material are performed with the robot 19. Note that for this apparatus, a cooling platform 21 is separately provided. The product taken out of the feed/discharge plate 172 with the sucking hand 193 is temporarily placed on the cooling platform 21 until the temperature of the product is decreased to a predetermined value, otherwise, the product is forcibly cooled down.

Note that the press-molding apparatus has an aligning device for alignment of the glass material with upper and lower molds within the mold 1 with high precision. The aligning device will be described in detail later.

<Mold Device>

Figure 4:
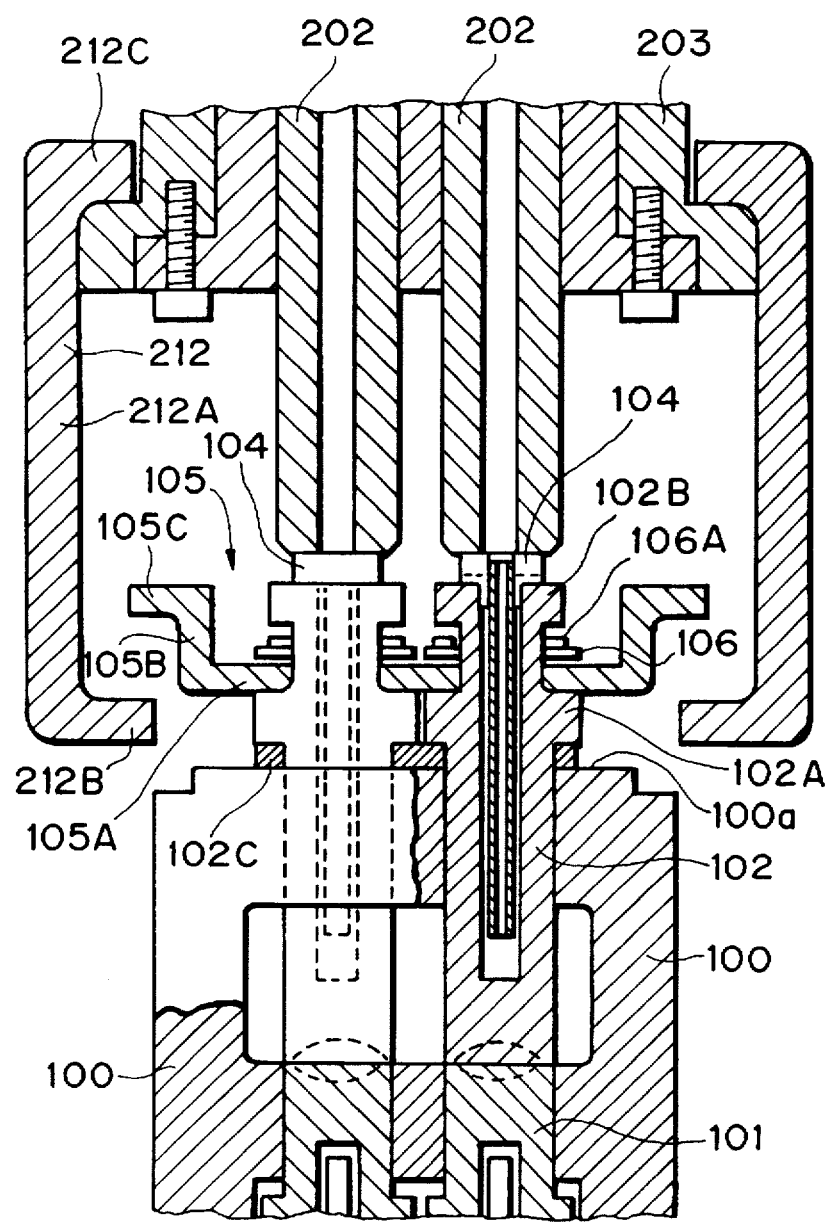
FIG. 4 is a cross-sectional view showing a significant part between numerals A1 to A2 in FIG. 3.
Figure 5:
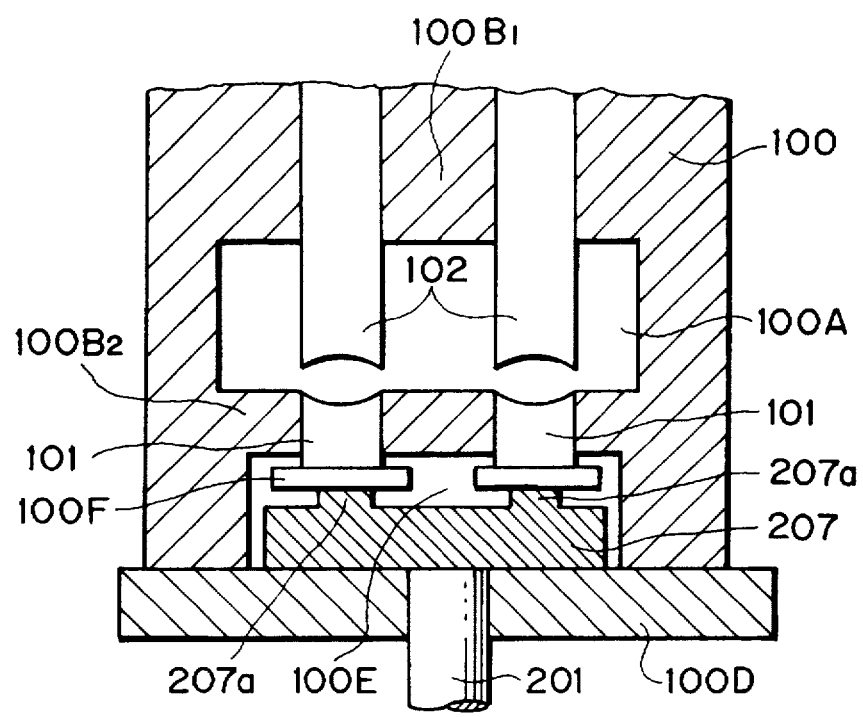
FIG. 5 is a cross-sectional view showing a significant part in FIG. 4.
Figure 6:
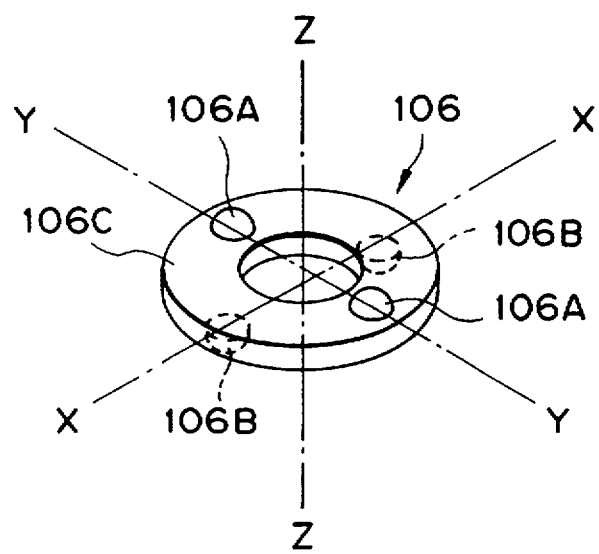
FIGS. 6 to 8 are cross-sectional views showing a center-adjusting member.
Figure 7:
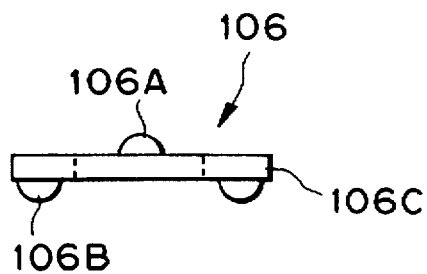
Figure 8:
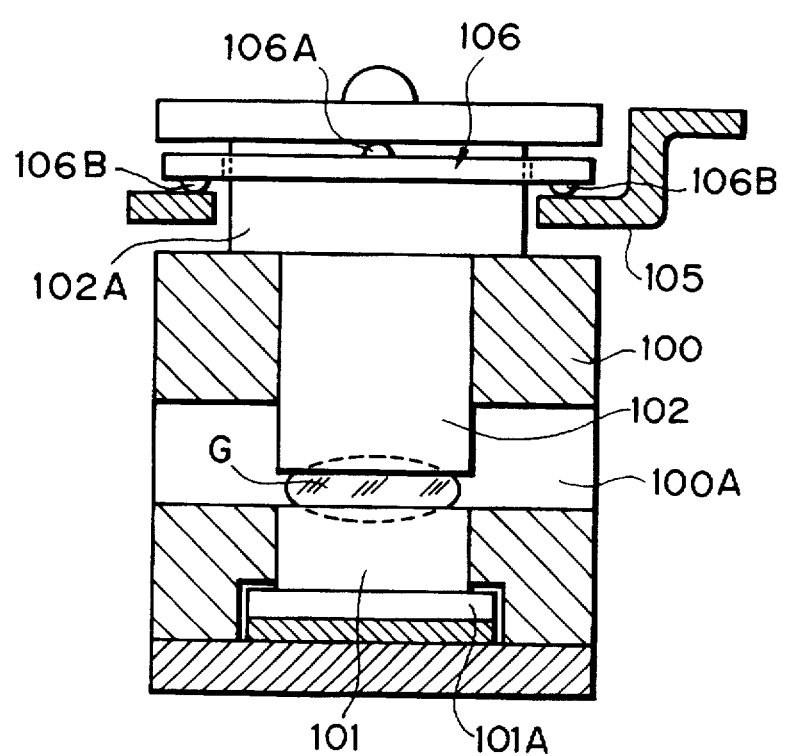

Next, a mold device used in the press-molding apparatus will be described. FIG. 3 is a cross-sectional view showing a significant part of the mold device used in the press-molding apparatus. FIG. 4 is a cross-sectional view showing a significant part between numerals A1 to A2 in FIG. 3. FIG. 5 is a cross-sectional view showing a significant part in FIG. 4. FIGS. 6 to 8 are cross-sectional views showing a center-adjusting member.

As show in FIGS. 3 to 5, in the mold device, a palette 5 is fixedly held on the guide rail 6B, and a bottom plate 100D, screw-combined with the mold body 100, is placed on the palette 5. The mold body 100 has a rectangular-parallelepiped shape, and has an opening 100A passing in a vertical direction through the mold body 100. The upper ceiling 100B1 above the opening 100A has four through holes to the opening 100A, into which four upper molds 102 are inserted.

The mold 1 has a four-mold structure where four lower molds 101 and four upper molds 102, arranged around the center of the mold body 100, are incorporated into the mold body 100. For feeding glass materials and discharging of products by the above-described sucking pad 403, the opening 100A is provided at the side portion of the mold body 100, as the entrance/exit for the sucking pad 403. The mold body 100 is fixed on the palette 5 within the molding chamber 3.

In the rectangular-parallelepiped mold body 100, a mold-body bottom 100B2 has four holes, into which the lower molds 101, corresponding to the four upper molds 102, are inserted.

The mold-body bottom 100B2 has a notch 100E within which the thrust-up piece 207 is provided. The upper surface of the thrust-up piece 207 has four projections 207a. Spacers 100F are provided on the projections 207a, and further, the lower molds 101 are provided on the spacers 100F. When the thrust-up member 207 is thrust up by a lower press rod 201, the projections 207a prevent the pressing force from acting on each center of the lower molds 101 to offset the pressing force of the lower molds 101.

The respective spacers 100F adjust variation in measurement precision of the lower molds in the axial direction.

One of the features of the present apparatus is to simultaneously press-mold a plurality of products by a plurality of sets of upper and lower molds; in this example, the apparatus press-molds four products by four sets of upper and lower molds. The four upper molds receive the total 2400 kg pressure. Preferably the upper molds receive equal pressure.

However, traveling strokes of the respective upper and lower molds for molding are somehow shifted due to variation in the final measurement precision of the upper molds, the lower molds and the mold body. The spacers 100F are provided for adjusting the strokes.

The lower press rod 201, the bottom plate 100D, the thrust-up piece 207 and the spacers 100F respectively have a passage to supply cooling medium to the lower molds. The upper molds 102 have a large-diameter portion 102A and a flange 102B above the large-diameter portion 102A (See FIG. 4).

A pull-up member 105, for simultaneously pulling up the upper molds 102, has a disk member 105A, a cylinder 105B, a flange 105C, and four holes, to which the four upper molds are inserted, on the disk member 105A.

(Center-Adjusting Member)

As shown in FIG. 4, a center-adjusting member 106 is provided between the disk member 105A of the pull-up member 105 and the flange 102B of the upper molds.

In FIGS. 6 and 7, the center-adjusting member 106 with a ring shape has a couple of projections 106A on the upper surface of the ring and a couple of projections 106B on the rear surface of the ring. The projections 106A, opposed to each other, are arranged on a line orthogonal to a line on which the projections 106B are arranged, also opposed to each other. In FIG. 4, the center-adjusting member 106 is provided on the upper surface of the disk member 105A of the pull-up member 105. The projections 106B (not shown in FIG. 4) are in contact with the upper surface of the pull-up member 105 (See FIG. 8).

A hook member 212, for pulling the pull-up member 105 upward (in FIG. 4), has a support 212A, a lower-end hook 212B and an upper-end hook 212C. The lower-end hook 212B is engaged with the flange 105C of the pull-up member 105, while the upper-end hook 212C is engaged with the holder block 203.

As described above, one of the features of the present apparatus is to simultaneously press-mold a plurality of products by a plurality of sets of upper and lower molds; in this example, the apparatus press-molds four glass materials with four sets of upper and lower molds, then pulls up the upper molds to take out four products between the upper and lower molds, and takes the products remaining on the lower molds from the opening 100A of the mold body 100.

In this case, there are two methods for pulling up the upper molds; i.e., to perform pull-up operation by each mold, and to simultaneously pull up all the molds (to perform pull-up operation by two molds is possible).

This apparatus pulls the four molds simultaneously to increase productivity per unit hour, and adjusts the centers of the upper molds by the center adjusting member 106. That is, as the hook member 212 is pulled upward, the lower-end hook 212B abuts against the flange 105C of the pull-up member 105, then the pull-up member 105 is raised.

As shown in FIGS. 6 and 8, when the pull-up member 105 is moved upward, the pull-up 105 and the center-adjusting member 106 are in contact at the points of the projections 106B on the rear surface of the center-adjusting member 106, along the line X—X vertical to the axis Z—Z, while the center-adjusting member 106 and the flange 102B of the upper molds are in contact at the points of the projections 106A on the upper surface of the center-adjusting member 106. In this manner, the upper molds 102 are pulled up while the relations among the orthogonal lines X—X and Y—Y both vertical to the axis Z—Z is maintained. This prevents inclination of the axis Z—Z upon pull-up operation, and prevents "gnawing" at the molds upon sliding.

In FIG. 4, when the upper molds are pulled up by the hook member 212B, and the products are taken out and new glass blanks are placed on the lower molds for the next press-molding, the hook member 212 is moved downwards, and the upper molds are slid downwards within the through holes of the mold body via the pull-up member 105 and the center-adjusting member 106. In this case, the above-mentioned operation of the center-adjusting member 106 solves the object that the four upper molds must be slid without "gnawing" with the mold body.

In the state where the upper molds are held at upper positions, the upper molds maintain the orthogonal lines X—X and Y—Y vertical to the axis Z—Z. When the hook member 212 is moved downward in this state, the upper molds 102, the center-adjusting member 106 and the pull-up member 105 are moved downwards by their own weight, thus maintaining the above-described vertical status of the orthogonal lines X—X and Y—Y, which prevents the "gnawing" at the molds.

(Upper Press Mechanism)

In FIGS. 3 and 4, a press plate member 104 is provided on the upper surface of the flange 102B of the respective upper molds 102, for focusing the pressure from the upper press rods 202 in the axial directions of the upper molds 102.

The press plate member 104 receives the pressure of the rods 202 at points in contact with the rods 202. The holder block 203 has a shaft 203A, a lower flange 203B and an upper flange 203C. The shaft 203A has four through holes 203a. Numeral 203D denotes a cylinder member engaged within the lower part of the holder block 203. As described above, the lower ends of the upper press rods 202 are in contact with the press plate member 104, and parts of the upper ends, 202A, are engaged with the through holes 203A of the holder block 203. Cooling pipes 220 are inserted into the through holes 203A of the holder block 203, and the upper ends of the cooling pipes 220 are connected to cooling-medium supply openings of a cooling-medium dispenser board, and the lower ends of the cooling pipes 220 are inserted into through holes of the upper press rods 202.

Gaps 203e having ring cross-sections are formed between the through holes 203A of the holder block 203 and the cooling pipes 220, and a press adjusting mechanism is incorporated in each of the gaps 203e.

The upper press rods 202 can move up/down guided by the cylinder member 203D provided at the lower end of the holder block 203, and are held with conical springs 208 (to be described later) elastically so that they can move downward relatively with respect to the holder block 203, to a predetermined position. Note that in this apparatus, the conical springs 208 comprise a plurality of overlaid conical springs, as will be described later, however, other constructions may be applied to the conical springs 208.

A common rod (piston rod) 209 is connected to the upper end of the holder block 203. The common rod 209 extends through the ceiling of the molding chamber 3 to the outside of the chamber 3, and is connected to a piston rod 211 which extends from a cylinder mechanism (air cylinder) 210, used for pressing, provided on the molding chamber 3.

(Press Adjusting Mechanism)

The press adjusting mechanism comprises a plurality of conical springs 208 inserted in the gap 203e and the upper press rod 202 and the like. One of the objects of the present invention is to provide a press-molding apparatus that can simultaneously obtain a plurality of products by plural sets of upper and lower molds. For this purpose, it is necessary to apply equal pressing force to the four sets of molds.

In the mold device shown in FIG. 3, the pressure from an upper press cylinder is received by a cooling medium dispenser board 222 via the cylinder rod 209, and the pressing force of the cooling medium dispenser board 222 is acted on the four upper molds 102 via the upper press rods 202. Preferably, the pressing force (e.g., total 2400 kg) of the dispenser board 222 is distributed into even 600 kg on the respective upper molds 102. Variation in the distribution of pressing force to the upper molds cause degradation of quality of four products (e.g., variation in the thickness of the lenses due to uneven pressing force).

Further, it is conceivable that variation in the measurements of the respective sets of upper and lower molds and the upper press rods causes differences among the travel strokes of the respective molds by the pressing force of the dispenser board 222, which changes traveling amounts of the upper molds.

On the other hand, to form high-precision optical devices by heating and pressing glass materials, it is necessary to generate high pressure (400 kg to 600 kg) in the molds, and to transmit the pressure to the upper molds via press rods from a cylinder rod. Further, in an apparatus that repeats processes of heating glass materials within molds at predetermined temperature (e.g., 400° C. to 700° C.), press-molding the glass materials, and discharging the products, the cycle of heating-cooling-heating processes must be reduced so as to repeat heating and cooling the products, the mold members, the mold body and the like. For this purpose, downsizing of the apparatus is required.

In addition, in the present apparatus, to obtain the same products, e.g., lenses having the same thickness, the thickness of the products is determined by pressing the upper molds 102 by the upper press rods 202, whereby pressing the lower end of the large-diameter members 102A of the upper molds to upper end surface 100A of the mold body 100 via the spacers 102C, whereby defining traveling positions of the upper molds.

The essential condition for obtaining the same thickness of the four products is that all the four upper molds 102 abut against the upper end surfaces 100a of the mold body 100 via the spacers 102C. For this purpose, the upper molds must independently receive pressing force, and the upper molds must completely abut against the upper end surface 100A of the mold body 100, further, sufficient pressing force must act on the upper molds.

Figure 9:
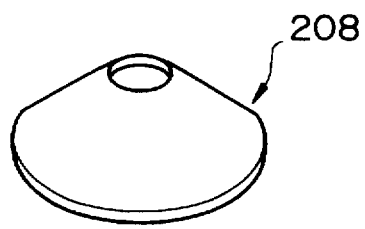
FIG. 9 is a perspective view showing a spring mechanism.
Figure 10:
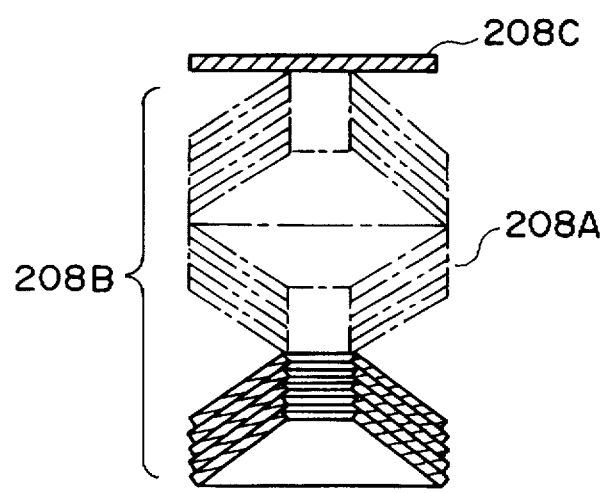
FIG. 10 is an explanatory view of the spring mechanism.

In this apparatus, the press adjusting mechanism is developed by inserting the spring member for receiving the pressing force of the dispenser board 222, i.e., conical springs as shown in FIGS. 9 and 10, into each of the gaps 203e. That is, the conical springs 208, each having an open central portion, are overlaid in the same direction, into a spring set 208A, and a plurality of spring sets 208A are overlaid in opposite directions to each other, as a spring mechanism 208B. The spring mechanism 208B is inserted into each of the gaps 203e.

The spring mechanisms 208B inserted into the gaps 203e contract upon receiving the pressing force from the dispenser board 222, then the pressing force is transmitted to the upper press rods 202 via the spring mechanisms 208B, and the upper press rods 202 press the upper molds 102. The upper molds 102 slide in the through holes of the mold body 100 until the large-diameter members 102A abut against the upper end surface 100A of the mold body 100 via the spacers 102C. In the four sets of molds, when the large-diameter members 102A of three of the upper molds abut against the upper end surface 100A of the mold body 100, even if the other large-diameter member 102A has not abutted against the upper end surface 100A, the upper mold not in contact with the upper end surface 100A can be pressed against the upper end surface 100A, by pressing it from the dispenser board 222 via the spring mechanism 208B and the press rod 202. This ensures that all the four upper molds can always be moved down to constant positions, thus maintains a constant thickness of the products.

Next, an example of the specification of the spring mechanism will be described.

In this specification, the conical spring 208 has an exterior diameter of φ 18 mm, an interior diameter of φ 9.2 mm, a thickness of 1 mm, and a freedom height of 1.5 mm. One spring set 208A comprises of six conical springs 208 overlaid in the same direction, so that the spring set 208A can receive pressure of 850 kgf, (i.e., k=2720 kgf/mm (k: spring constant)). The spring sets 208A are overlaid opposite to each other, to form four spring mechanisms 208B having a spring constant of 136 kgf/mm. The variation in the entire lengths is adjusted. Further, the thickness of the spacers 208C are adjusted for receiving extra 50 kgf pressure for prevention of backlash. Then, the spring mechanisms 208B are incorporated into the holder block 203, having a pitch of 20 mm between the axes of each press rods 202. In this state, when the thrust force of the cylinder rod (total pressure applied to the upper molds 102) is set to 3200 kgf, and the variation in the pressure of the press rods 202 is measured, it is found that the variation is up to 15 kgf. Thereafter, lenses for video cameras are formed so that the products have a diameter of φ 10 mm, a central thickness of 3.5 mm and curvature of the lens surface is 15 and 20, by using four mold sets, adjusted to have variation in height to the press plate member 104 up to 0.2 mm, with pressing force of 600±40 kgf as one of the press-molding conditions. As a result, the four molds complete pressing substantially simultaneously, and the obtained products completely correspond with the cavity spaces formed in the respective mold sets, and have allowable values which sufficiently satisfy the expected thickness precision and optical surface slopes.

Note that above the spring mechanisms 208B, the spacers 208C as adjusting members for correcting the differences in the measurements of the respective molds are provided as shown in FIG. 10.

Note that cooling pipes 213 and 214 are introduced to perform cooling control on the lower and upper molds 101 and 102. Further, introduction passages 215 and 216 for introducing cooling medium are formed in the rods 201 and 202, and connected to the cooling medium introducing member 101C and 102D formed in the lower and upper molds 101 and 102.

<Press-Molding Process>

Next, press-molding process by the press-molding apparatus will be described. FIGS. 11A to 11D are cross-sectional views explaining the press-molding process.

Figure 11A:
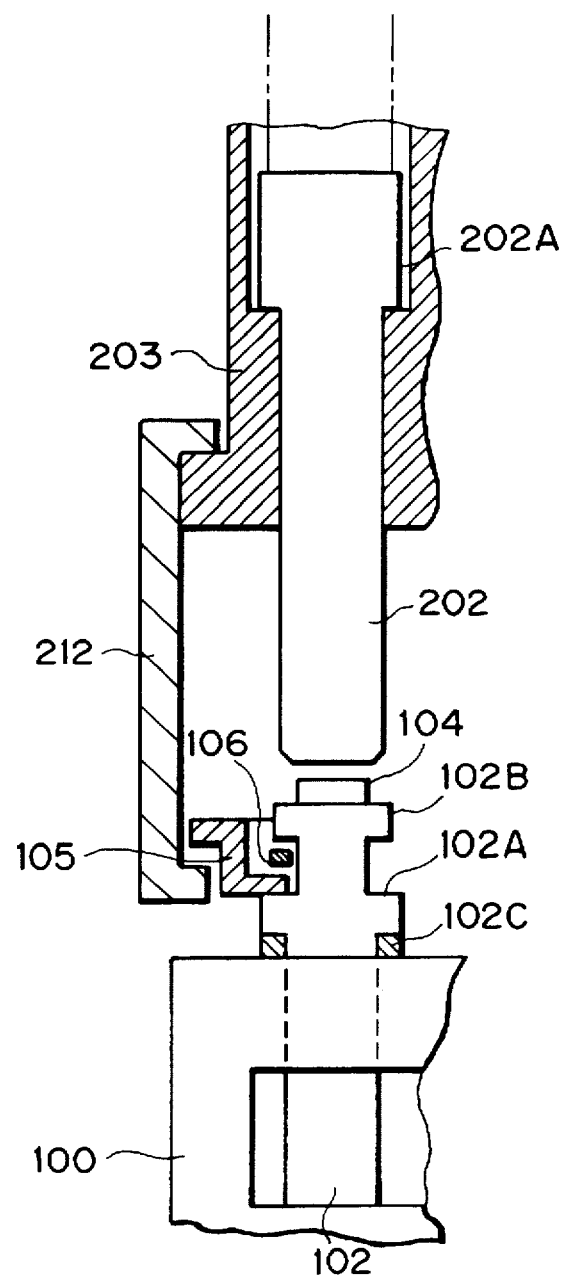
FIGS. 11A to 11D are cross-sectional views explaining press-molding process.
Figure 11B:
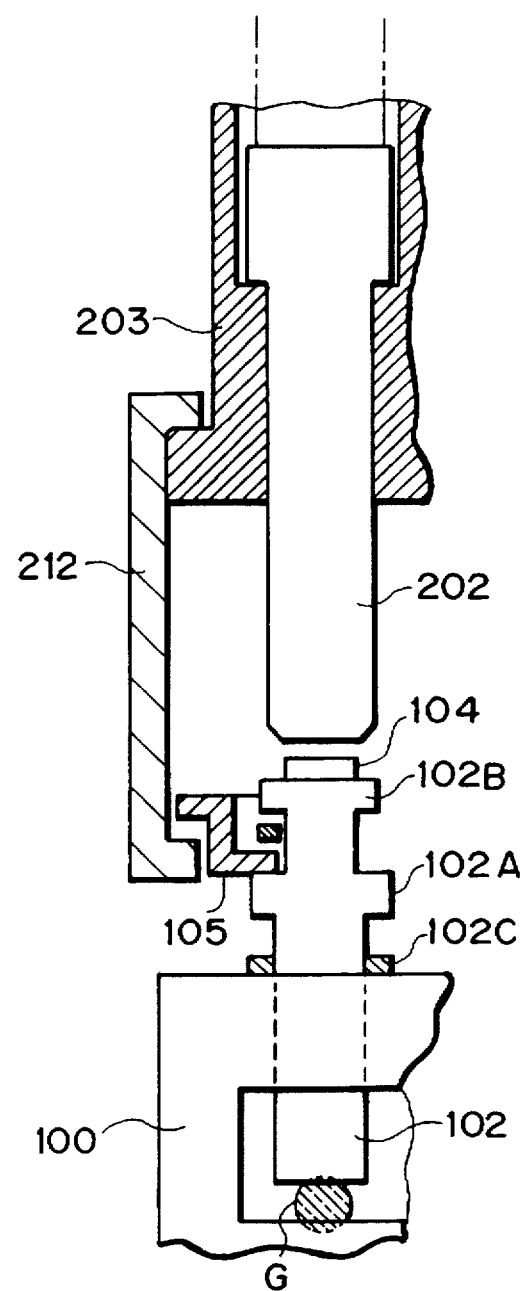

In FIGS. 11A to 11D, when the glass material is press-molded by using the press-operating mechanism 2 in FIG. 1, first, from a state as shown in FIG. 11A, the holder block 203 is raised then the upper mold 102 is pulled up via the hook member 212, by the operation of the cylinder mechanism 210, to a mold-open state. Next, the glass material G is introduced into the mold 1 by the sucking hand 402, and the holder block 203 is moved downward. At this time, the upper mold 102 moves onto the glass material as shown in FIG. 11B. Thereafter, the cylinder mechanism 210 is driven to further move the holder block 203 downward, then the upper press rod 202 applies pressure to the center of the upper mold 102 via the press plate member 104 as a contact piece (thereafter as shown in FIG. 1, upon cooling, the cylinder mechanism 205 pushes up the low press rod 201 from a lower position, to press the lower mold 101 upward via the thrust-up piece 207). After the press-molding, the cylinder mechanism 210 is driven to raise the holder block 210, the upper mold 102 is pulled up and the mold 1 is opened. Accordingly, even if there is clearance at a sliding portion of the upper mold 102 with respect to the mold body 100, which is necessary for sliding of the upper mold 102, the upper mold 102 is moved down while maintaining its vertical status. As a result, the positions of the respective molding surfaces of the lower and upper molds 101 and 102 are not shifted, and press-molding can be performed while holding the optical-functional surface of each molded optical device with respect to its optical axis.

Figure 11C:
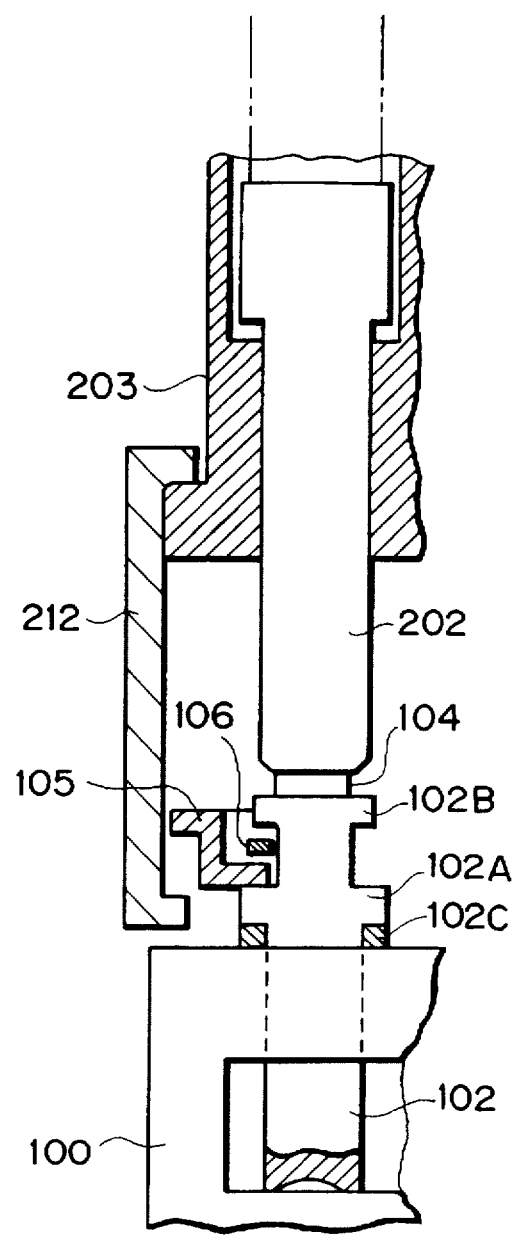

Especially, since the four upper molds 102 must be simultaneously driven by using the common cylinder mechanism 210, the differences in the measurements of the upper molds 102 and upper press rods 202 should be absorbed. However, since the upper press rods 202 are pressed via the spring mechanism 208 with elasticity, if the holder block 203 is further moved downward after the large-diameter members 102A of the upper molds 102 abut against the upper end surface 100a of the mold body 100, the movement can be stopped at that position, as shown in FIG. 11C.

Figure 11D:
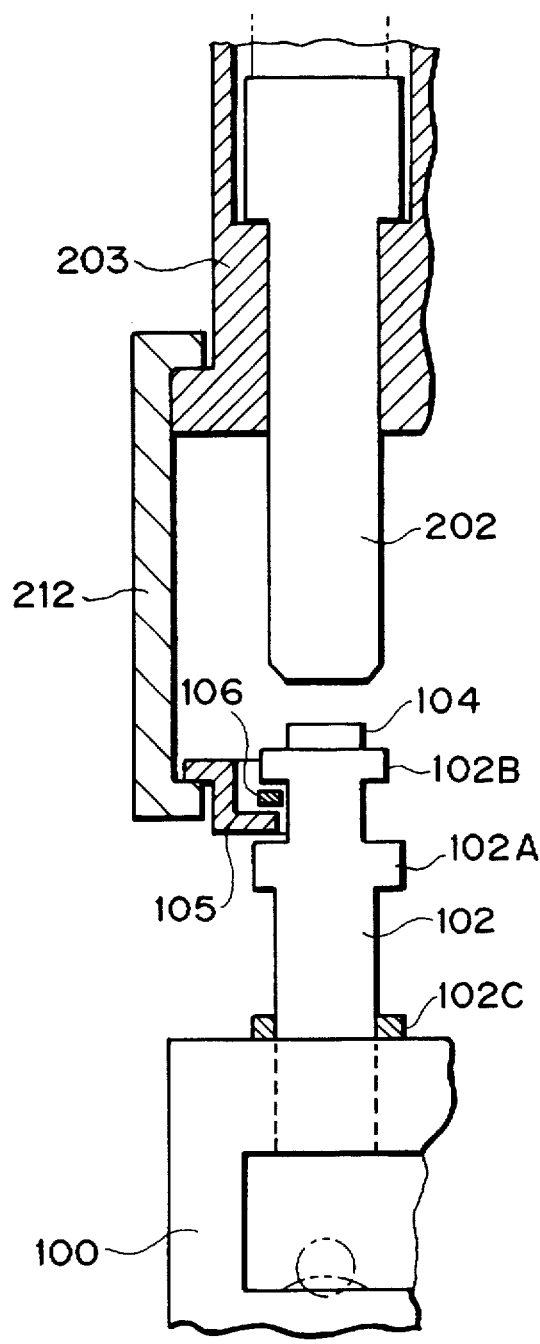

After the press-molding, to open the mold 1, the cylinder mechanism 210 is driven to raise the holder block 203, and the hook member 212 pulls up the pull-up member 105, as shown in FIG. 11D. At this time, the axis of the upper mold 102 is automatically adjusted by the operation of the center-adjusting member 106, therefore the upper mold 102 receives the pull-up force at its center, and does not incline within the necessary clearance range. Even if the holder block 203, the pull-up member 105 and the flange 102B are not formed with sufficient precision with respect to the mold body 100, the upper mold 102 can be raised vertically without "gnawing".

(Mold Exchange)

In the mold exchange chamber 12 shown in FIG. 1 has a mold exchange mechanism 7. The mold exchange mechanism 7 comprises an exchange mechanism 701 to carry the palette 5, on which the mold 1 is fixed, along the guide rail 6A, to the guide rail 6B in the molding chamber 3 through the gate valve 13.

The exchange mechanism 701 has a rod 702 extending into the mold exchange chamber 12. A hand 703 is attached to the distal end of the rod 702, and an actuator 705 is attached to the base end of the rod 702 via a thrust bearing 704. The rod 702 is rotated by a motor 706 provided at the actuator 705 via an L-shaped crank 707. Upon driving the actuator 705, the rod 702 can be moved in its lengthwise direction by moving the actuator 705 along a guide rail 708 parallel to the rod 702.

In the mold exchange mechanism 7, exchange mechanism 701, the rod 702 is rotated by the motor 706, and the operation of the rod 702 causes attachment/removal of the hand 703 to/from the palette 5. The operation of the actuator 705 can move the palette 5 along the guide rail 6A. Under the control of the exchange mechanism 701, the palette 5 is carried to the guide rail 6B in the molding chamber 3 via the gate valve 13, and set at a press-molding position of the press-operating mechanism 2, otherwise, carried from the press-molding position to the exchange chamber 2.

As shown in FIGS. 1–2, the mold exchange mechanism 7 has a palette exchange mechanism 711 for moving the palette 5. The palette exchange mechanism 711 comprises a cylinder mechanism 712, having a piston rod 712A which reciprocates in a direction orthogonal to the lengthwise direction of the guide rail 6A, on one side of the mold exchange chamber 12, and a tray 713 having stages 713A and 713B at the distal end of the piston rod 712A. The above-described guide rail 6A is attached to each of the stages 713A and 713B. Note that the mold exchange chamber 12 has an opening for carrying in/out the mold 1, on its other side, where a gate 12A is provided.

In this palette exchange mechanism 711, the gate 12A is opened in advance, then, the cylinder mechanism 712 is operated to move the tray 713 to the outside from the opening of the mold exchange chamber 12, and e.g., the palette 5 holding a new mold 1 is placed on the guide rail 6A of the stage 713A. Next, the cylinder mechanism 712 is reversed, to draw the tray 713, as shown in FIG. 2, toward the cylinder mechanism 712, then the gate 12A is closed, and the gaseous atmosphere within the mold exchange chamber 12 is exchanged for new atmosphere. In this state, the guide rail 6A of the stage 713B is positioned at the center (a palette-exchange position) of the mold exchange chamber 12.

Accordingly, the operation of the exchange mechanism 701 can take a used mold 1, with the palette 5 holding the used mold 1, from the molding chamber 3 onto the vacant stage 713B. Thereafter, the cylinder mechanism 712 is operated to position the stage 713A at the center of the mold exchange chamber 12, and again the exchange mechanism 701 is operated to transfer the new mold 1 with the palette 5 from the guide rail 6A to the guide rail 6B in the molding chamber 3, thus sets the mold 1 on the palette 5 to the press-molding position of the press-operating mechanism 2. Note that after the new mold 1 is set at the molding chamber 3, the gate 12A is opened and the used mold 1 is removed from the palette 5.

Note that the exchange mechanism 701 and the palette exchange mechanism 711 may be manually operated without using the actuator. Further, the gate valve 13 and the mold exchange chamber 12 may be removably connected so that the mold exchange chamber 12 can be commonly used by a plurality of molding mechanisms. In this case, the gate 12A is not indispensable, therefore the molds can be carried in/out from an opening of a joint between the gate valve 13 and the mold exchange chamber 12.

(Palette Temperature Control)

The mold 1 is placed on the palette 5 in advance. By carrying the palette 5 to the press-molding position of the press-operating mechanism 2, the matching between the mold 1 and the press-operating mechanism 2 can be made. This is based intentionally to avoiding degradation of working productivity by providing simple exchange operation in a short period, in accordance with necessity. Especially, considering a case where the exchange operation is performed in inactive-gas atmosphere, as movement from a mold exchange chamber to a molding chamber or vice versa is troublesome, the above arrangement to place the mold on the palette and move the palette to the press-molding position is more advantageous.

However, in this case where the mold is placed on the palette and the palette is aligned with the press-molding position, the matching between the press-operating mechanism and the mold is difficult. Generally, a position setting member such as a pin guide is used for receiving the palette in the alignment of the palette. When thermal expansion occurs at the palette due to the peripheral temperature, the center of the press operation of the press-operating mechanism and the centers of the mold are shifted from each other. This causes difficulty in matching the press-operating mechanism and the mold.

Figure 12:
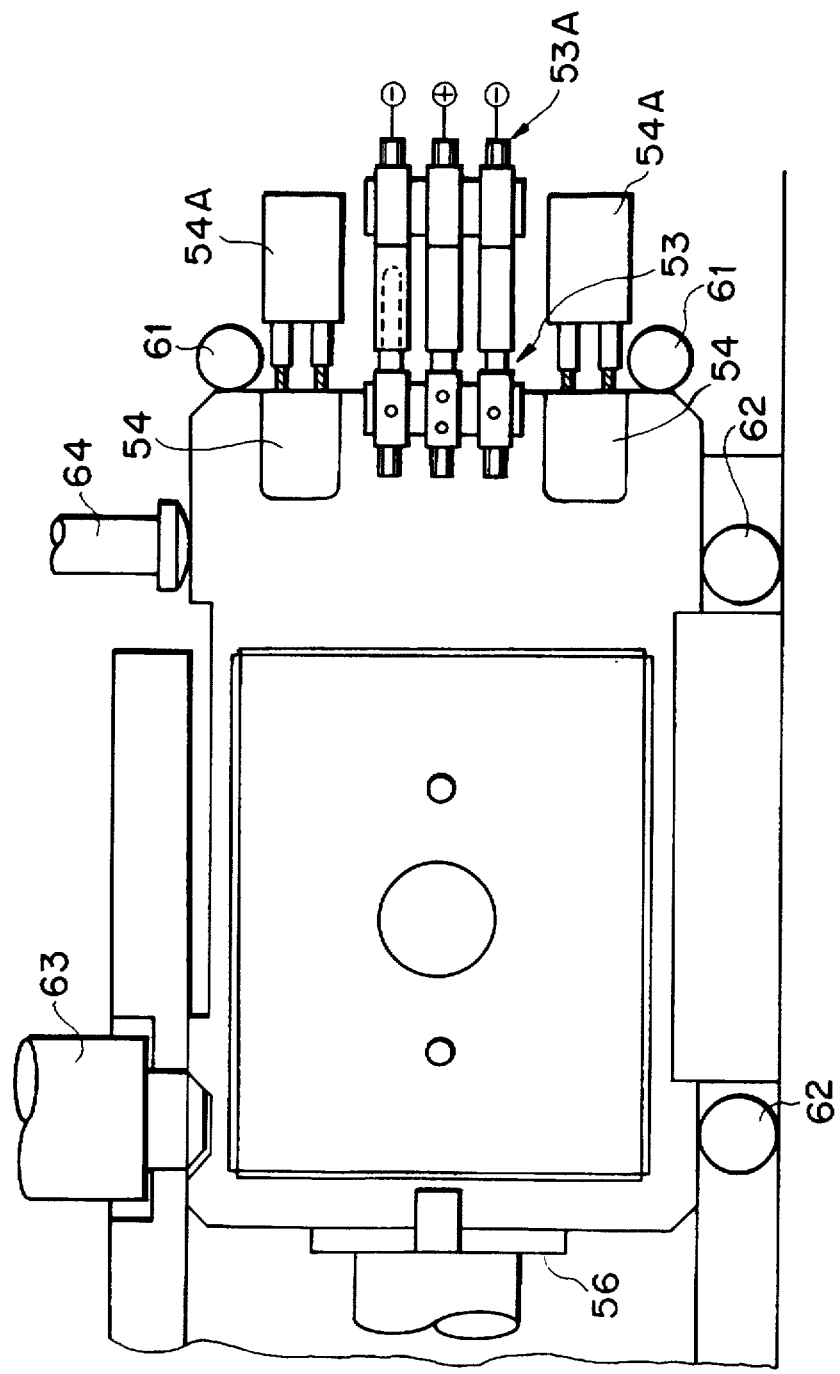
FIG. 12 is a horizontal sectional view explaining alignment of a palette to which the present invention is applied.

As shown in FIG. 12, position setting members 61 for receiving the end portion of the palette 5, and similar position setting members 62 for receiving one side of the palette 5 are provided at the press-molding position. To abut the side of the palette 5 against the position setting members 62, press operators 63 and 64 are provided at positions opposing to the position setting members 62.

Figure 13:
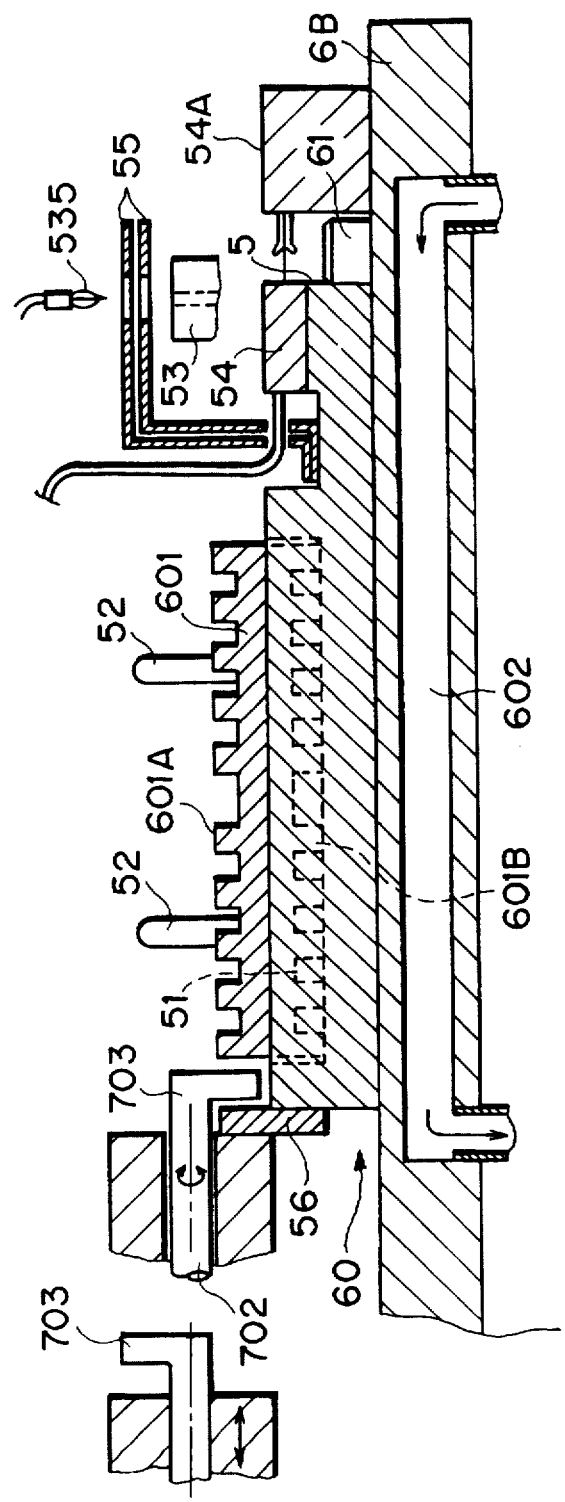
FIG. 13 is a cross-sectional view explaining cooling of the palette.

To avoid thermal expansion of the palette 5 due to influence of the peripheral temperature, a constant-temperature and thermal-insulating mechanism 60 is provided. In this example, the constant-temperature and thermal-insulating mechanism 60 has a thermal-insulating member 601 provided on the palette 5 side and a cooling mechanism 602 positioned under the palette 5 at the press-molding position, as shown in FIGS. 12 and 13.

The thermal-insulating mechanism 601 comprises a ceramic plate member, having a multitude of fins 601A on its upper surface and fins 601B on its rear surface, engaged with a flat tray stage 51 formed on the upper surface of the palette 5. The palette 5, on which the mold 1 is positioned with the guide pins 52, is placed on the thermal-insulating member 601.

The cooling mechanism 602 employs a circulating cooling system using cooling water. FIG. 13 shows only the cooling portion in contact with the bottom of the palette 5.

The palette 5 introduced to the press-molding position via the guide rail 6B abuts against the position setting members 61 at its distal end portion, then abuts against the position setting members 62 at its side by the operation of the press operators 63 and 64. Although in an indirect manner, matching between the mold 1 on the palette 5 with the centers of the lower and upper molds 101 and 102 can be made. In this case, the thermal-insulating member 601 insulates the heat from the mold 1 side to the palette 5, and the cooling mechanism 602 maintains the temperature of the palette 5 at a constant value. In this manner, the constant-temperature and thermal-insulating mechanism 60 protects the relative position of the mold 1 with respect to the palette 5 from the influence of thermal expansion, so that the position of the palette 5 is not shifted from the regular press-molding position.

The palette 5 has a connector 53 for a power for heating on the mold 1 side and a connector 54 for a thermosensor (not shown) such as a thermocouple. On the other hand, a power-side connector 53A and a sensor-side connector 54A respectively corresponding the connectors 53 and 54 are provided at predetermined positions in the molding chamber 3.

Figure 14:
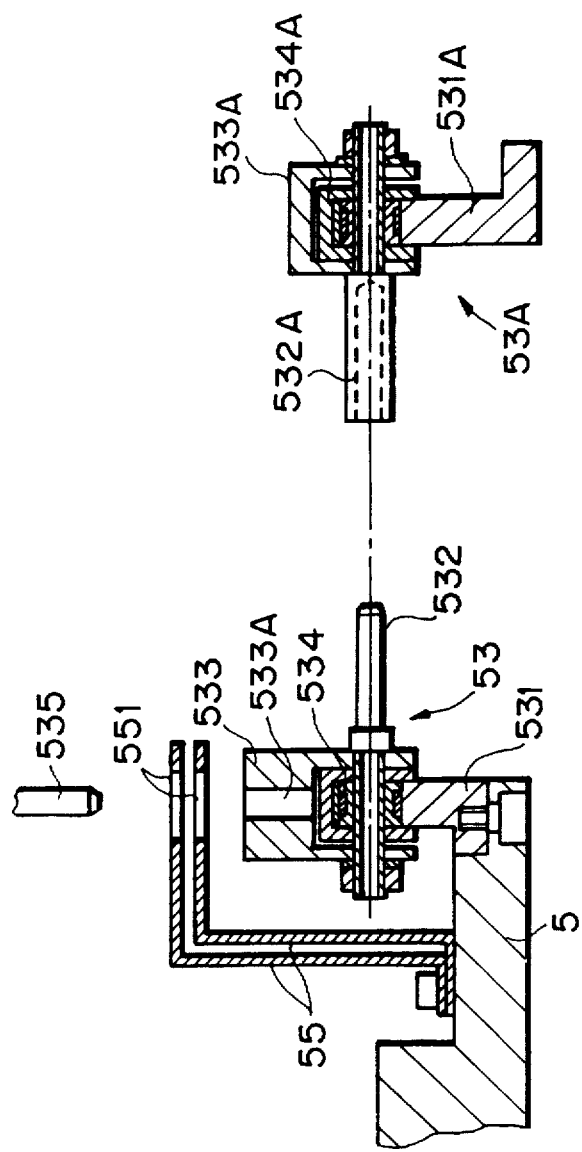
FIGS. 14 and 15 are cross-sectional views showing a connector to which the present invention is applied.
Figure 15:
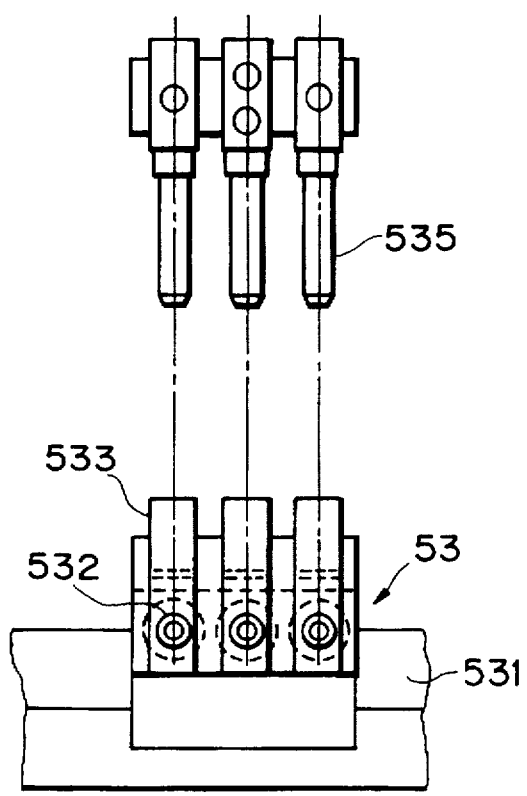

Note that the connector 53 in FIG. 14, is constituted by inserting a connector pin 532 through a support block 531 of an insulating material such as Teflon™, via a terminal block 533 electrically connected to the connector pin 532 and a common connection block 534 of similar insulating material to above, and attaching the connector pin 532 to the support block 531. The terminal block 535 has a connection hold 533A through which a connector pin 535 is removably inserted from the mold 1 side. Similarly, the connector 53A is constituted by inserting a female connector 532A through a support block 531A of insulating material, via a terminal block 533A electrically connected to female connector 532A and a common connection block 534A also of insulating material, and attaching the female connector 532A to the support block 531A. When the palette 5 is introduced to the press-molding position along the guide rail 6B and abuts against the position setting members 61, the female connector 532A is connected with the connector pin 532.

To protect these connectors from the influence of the heat from the mold 1 side, the palette 5 has a reflector 552 having a L-shaped plate member with an insertion hole 551 through which the connector pin 535 is inserted.

<Optical Device Molding Process>

Figure 16A:
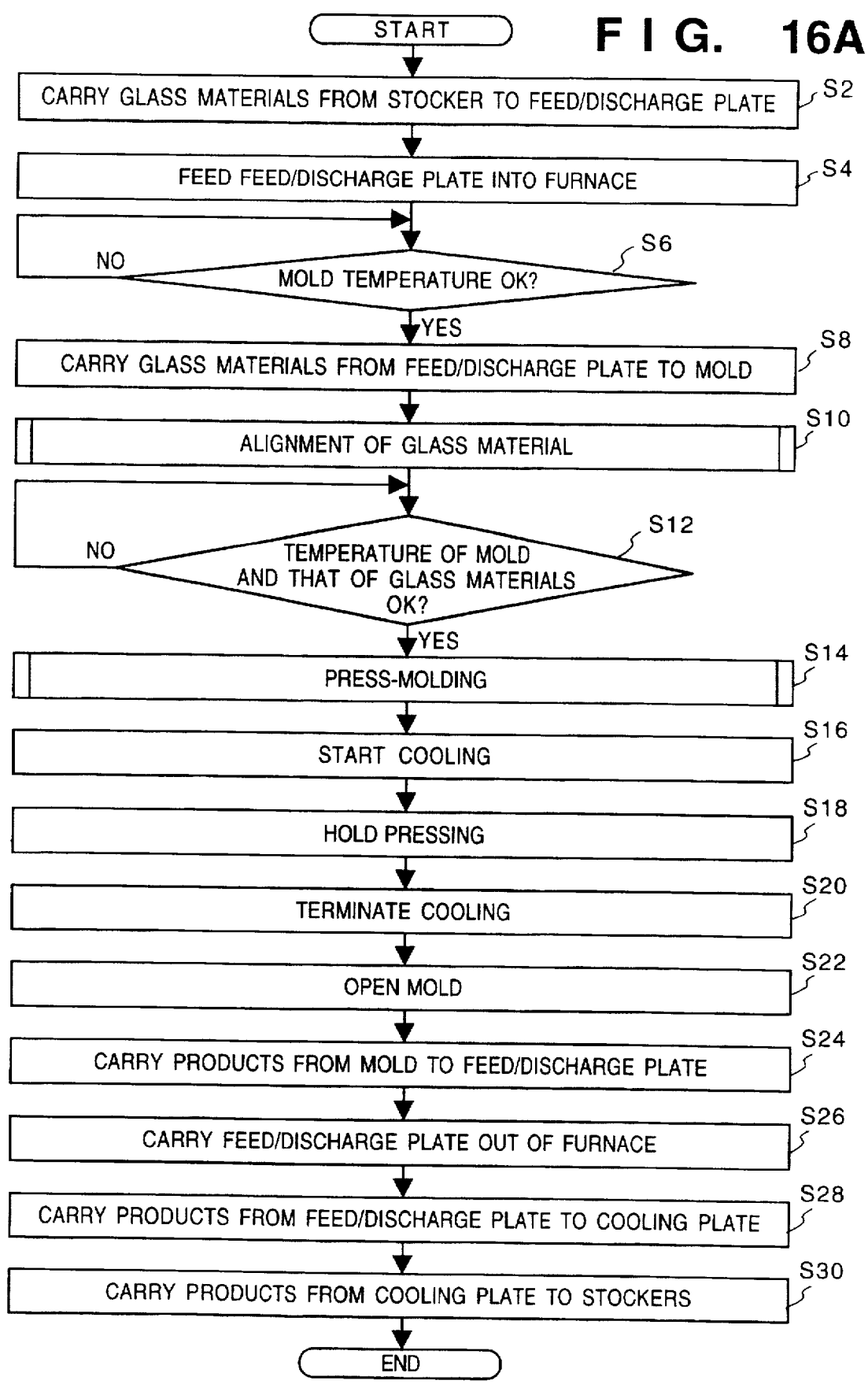
FIG. 16A is a flowchart showing process of forming an optical device by using the press-molding apparatus.
Figure 16B:
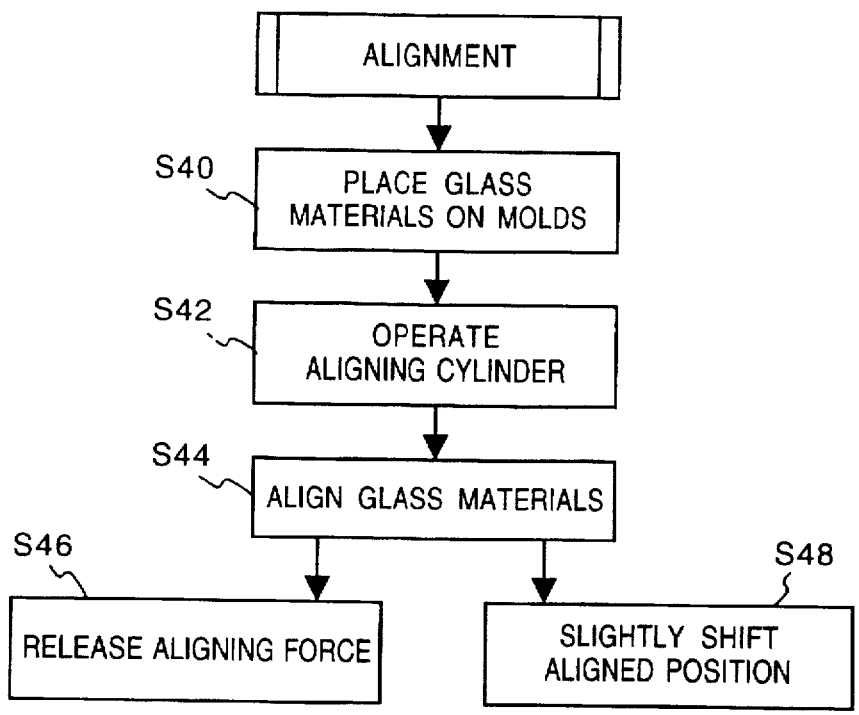
FIG. 16B is a flowchart showing an alignment processing in FIG. 16A.
Figure 16C:
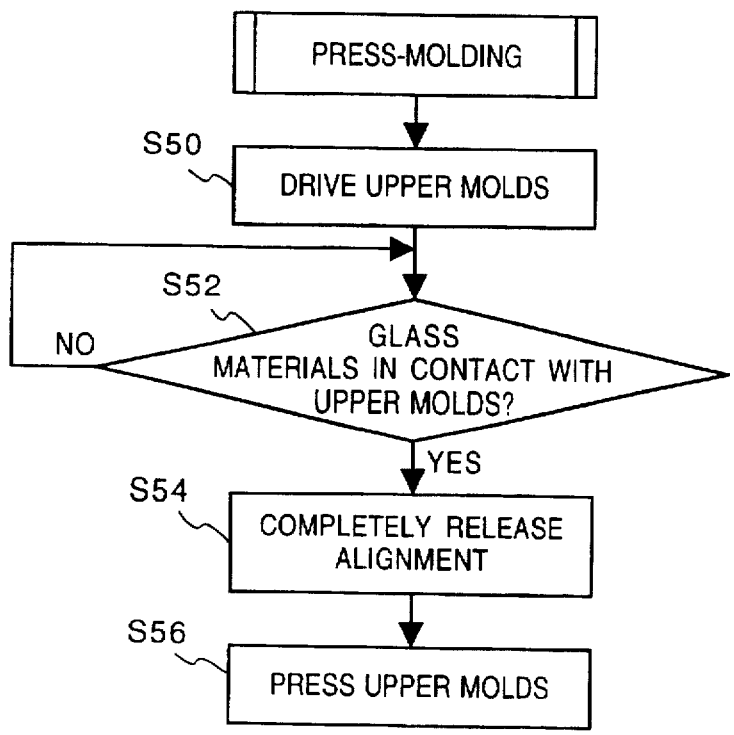
FIG. 16C is a flowchart showing a press processing in FIG. 16A.

Next, the process to mold an optical device by using the press-molding apparatus of this example will be described in the order of feeding, molding and discharging. Note that the optical device produced here is an aspherical-surface lens used in cameras and video cameras and the like. FIGS. 16A to 16C are flowcharts showing the process for press-molding the optical device by using the press-molding apparatus.

Glass material G, which are glass blanks formed close to a completed form, are placed on the palette 20C of the stock tray 20. As the rotational axis of the palette 20C is rotated by 180° by the driving of the electric motor 20B, the robot 19 is operated to move the sucking hand 193 to the position of the glass material G to suck-hold the one glass material G from the palette 20C. Next, the robot 19 operates the sucking hand 193 to place the glass material G onto the feed/discharge plate 172. This operation is repeated four times to place four glass materials G onto the feed/discharge plate 172. The glass materials on the feed/discharge plate 172 are heated to an appropriate temperature in advance. As described above, these glass materials are fed within the molding chamber 3, by the operation of the feed/discharge mechanism 17, then suck-held by the sucking pad 403 of the exchange mechanism 4, heated to, approximately 400° C., and introduced into the mold 1. In the mold 1, the lower and upper molds 101 and 102 are heated to correspond to glass viscosity of about $10^{16}$ poise.

As described above, the operation of the cylinder mechanism 210 moves the upper molds 102 downward and stops before they come into contact with the glass materials G, when the glass materials are heated to have glass viscosity of about $10^{10.5}$ poise (the lower molds 101 have a temperature corresponding to a viscosity of about $10^{9.5}$ poise), utilizing an electrothermal heater (not shown). Then, press-molding is performed with, e.g., 400 kg on the upper molds 102. After the flanges 102B have come into full contact with the upper end of the mold body 100 via the spacers 102C, the cooling material is introduced into the cooling-medium introducing members 101C and 102D of the lower and upper molds 101 and 102, and the lower molds 101 are pressed upward, while the viscosity of the glass materials G is from $10^{10.5}$ to $10^{13}$ poise. Thereafter, the cooling is continued, and when the temperature of the products becomes corresponding to glass viscosity of $10^{14.5}$ poise, the electrothermal heater (not shown) and the cooling medium introduced into the cooling-medium introducing members 101C and 102D cause a temperature difference between the lower and upper molds 101 and 102 (at this time the temperature of the upper molds 102 is lower than that of the lower molds 101), so as to lower the temperature of the products, to correspond to glass viscosity about $10^{15}$ poise. Then, the upper molds 102 are raised to open the mold 1, and the products are taken between the lower and upper molds 101 and 102 out of the mold 1, by using the sucking pad 403.

Thereafter, the products are returned onto the feed/discharge plate 172 by the reversed operation of the exchange mechanism 4, taken by the feed/discharge mechanism 17 from the molding chamber 3, further, temporarily placed on a cooling plate 21 and cooled down to an appropriate temperature, and taken out of the apparatus.

Note that in this example, the mold 1 including the four lower and upper molds 101 and 102 is operated within a common mold body 100, however, the structure of the center-adjusting member 106 as shown in FIG. 8 may be applied to each couple of the lower and upper molds 101 and 102.

FIG. 16A to 16C are flowcharts showing a process of press-molding the optical device using the press-molding apparatus of this example.

In FIG. 16A, as the process starts, the glass material is placed from a stock tray (the palette 20C of the stock tray 20) onto a plate (the feed/discharge plate 172) at step S2. At step S4, the plate is introduced into a furnace (the molding chamber 3). At step S6, after the temperature in a mold has increased to a predetermined value (YES at step S6), the process proceeds to step S8 at which the glass material is introduced from the plate to the mold. At step S10, processing to align the mold with the glass material is performed. At step S12, after the temperature of the mold and that of the glass material respectively have increased to a predetermined value (YES at step S12), the process proceeds to step S14 at which press-molding processing (downward-movement of the upper molds 102) is performed. At step S16, cooling of the mold is started, and at step S18, the mold is held in press-molding status (upward pressing of the lower molds 101). Thereafter, the cooling is ended at step S20, and the upper and lower molds are opened. At step S24, the products are carried from the mold to the plate. At step S26, the plate on which the products are placed (the feed/discharge plate 172) is carried out of the furnace, and at step S28, the products are carried from the plate onto the cooling plate 21. At step S30, the products are carried from the cooling plate 21 to the stock tray, then the series of press-molding process ends.

(Alignment Procedure)

Next, the aligning processing at step S10 in FIG. 16A will be described. Note that the detailed explanation of the alignment will be described later.

In FIG. 16B, first, the glass materials are placed on the molds at step S40, and an aligning cylinder (a drive cylinder 814 in FIG. 18) is operated at step S42. The glass materials are aligned with the molds at step S44. Thereafter, the process proceeds to step S46 or S48, to cancel aligning force, to slightly shift the aligning position and terminate the aligning, or to terminate the aligning without shifting the aligning position.

(Press-Molding Procedure)

Next, the press-molding at step S14 in FIG. 16A will be described.

In FIG. 16C, first, the upper molds 102 are driving at step S50, and are moved downward until they come into contact with the glass molds at step S52. At step S54, contact members of the aligning member are moved to siding positions, and the aligning force is released. Thereafter, the upper molds are pressed with predetermined weight at step S56, thus performing press-molding.

<Alignment of Molds and Glass Materials>

Next, a method for aligning the molds with the glass materials and an aligning device according to the aligning method will be described.

[First Embodiment]

Figure 17:
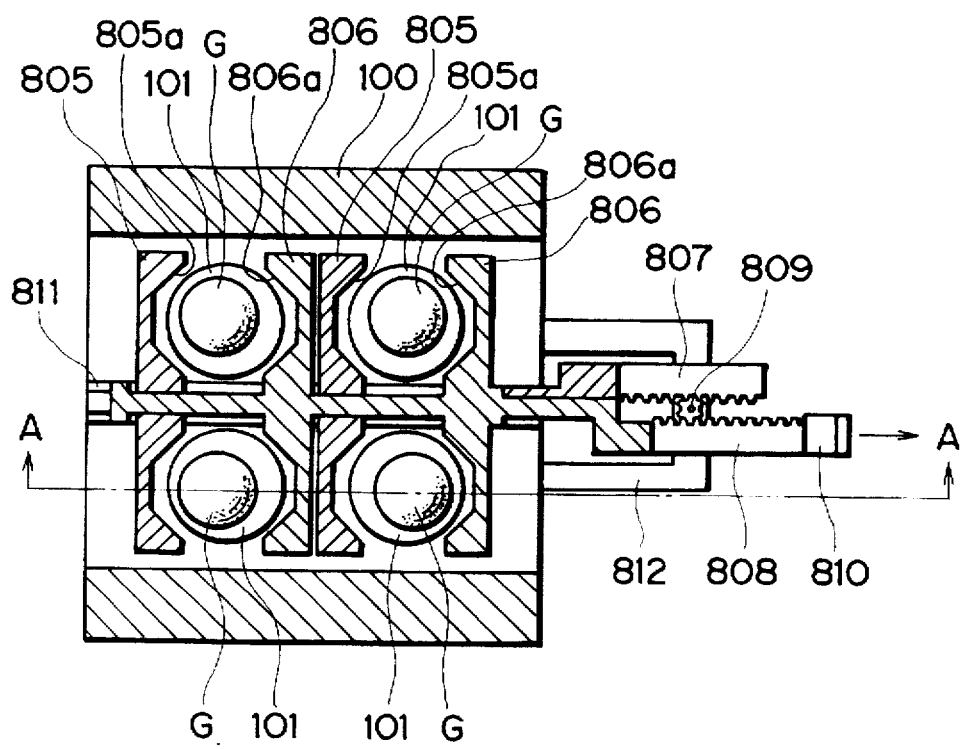
FIG. 17 is a plan view showing a mold device and aligning device according to a first embodiment of the present invention.
Figure 18:
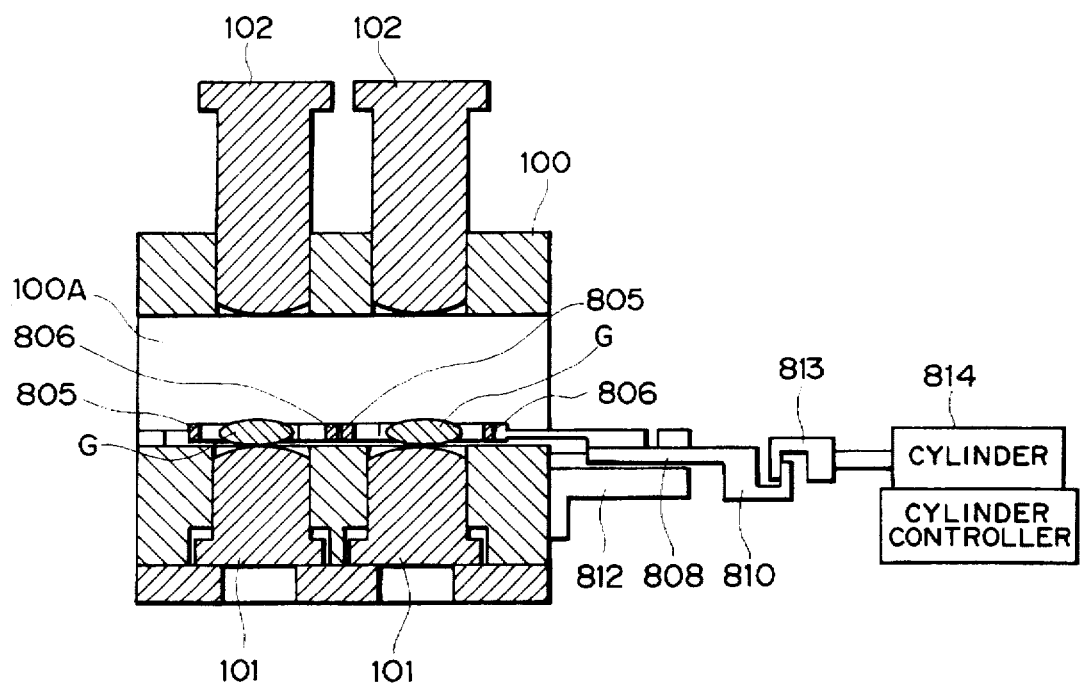
FIG. 18 is a cross-sectional view cut along a line A—A in FIG. 17.
Figure 19:
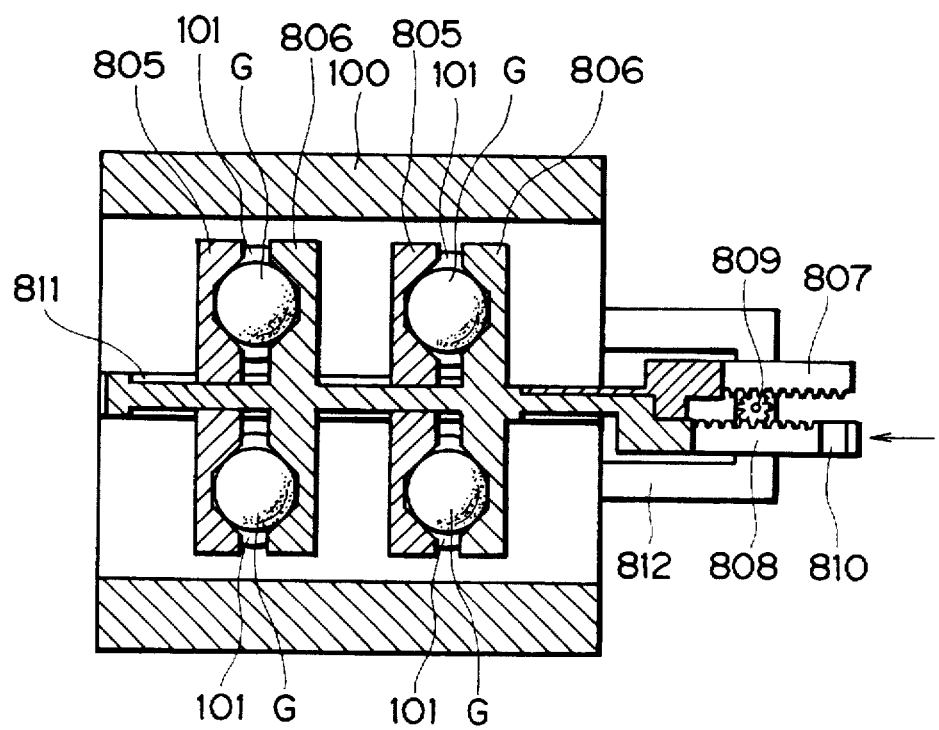
FIG. 19 is a plan view showing the mold device and the aligning device of the first embodiment, where alignment is performed.

FIGS. 17 to 19 show the structure of a mold device and an aligning device according to a first embodiment of the present invention. FIG. 17 is a plan view showing the mold device and aligning device to which an optical-device forming method according to a first embodiment of the present invention is applied. In FIG. 17, the glass material G is placed on the lower mold 101, and a contact members 805 and 806 of the aligning device have not performed alignment yet. FIG. 18 is a cross-sectional view cut along a line A—A in FIG. 17. FIG. 19 is a plan view showing the mold device and the aligning device, where the glass material G is aligned by the contact members 805 and 806 of the aligning device.

In FIGS. 17 and 19, the mold body 100 has an outer block which has a rectangular, approximately cubic shape, where four through holes are formed in the vertical direction, and on the upper surface side, the upper molds 102 respectively having a cylindrical shape are inserted into the through holes, slidably in the vertical direction. The upper molds 102 have disk-shaped flanges at their upper ends. The rear surfaces of the flanges come into contact with the upper surface of the mold 101 from an upper position, which stops the upper molds 102 from further moving downward. Thus press stroke of the upper molds 102 in the downward direction is defined. The upper molds 102 respectively have a lens-surface forming surface for forming an optical-functional surface by pressing the glass material G and transferring a predetermined shape onto the surface of the glass material G.

In the first embodiment, the glass material G has a coin shape or a flat drum shape.

Note that an upper air cylinder (See FIG. 1) for generating pressure to be applied to the glass materials G is provided above the upper molds 102, and the piston rods below the air cylinder are arranged along the vertical direction such that the lower ends of the piston rods are in contact with the upper end surface of the upper molds 102. As the upper air cylinder is operated to push the piston rods downward, pressure is applied to the glass materials G.

Further, the upper molds 102 respectively have a sensor (not shown) for measuring the temperature around the lens-surface forming surface and a cooling pipe (not shown) comprising an N2 pipe (not shown) for passing N2 (nitrogen) gas through from an N2 supply source (not shown) for cooling the upper mold.

On the other hand, on the rear surface side of the through holes of the mold body 100, the lower molds 101 which have cylindrical shapes, similar to the upper molds 102, are inserted slidably along the vertical direction. The lower molds 101 have disk-shaped flanges at their lower ends. The rear surfaces of the flanges are in contact with the upper surface of the bottom plate of the mold body 100. The pressure applied from the upper molds 102 via the glass materials G to the lower molds 101 is received by this bottom plate. The lower molds 101 respectively have a lens-surface forming surface for forming an optical-functional surface by transferring a predetermined shape onto the rear surface of the glass material G.

Accordingly, the glass materials G have an optical-functional surface as the upper surface, formed by transferring the surface shape of the upper mold 102, and have an optical-functional surface as the rear surface, formed by transferring the surface shape of the lower mold 101. The thickness of the products is defined by abutting the rear surface of the flanges of the upper molds 102 against the upper surface of the mold body 100, and the thickness is maintained at every press-molding.

Note that below the mold device, a lower air cylinder 205 (See FIG. 1) is provided. Piston rods of the lower air cylinder are in contact with the rear surface of the lower molds 101 sequentially through the through holes formed in the press-molding apparatus main body and at the bottom plate of the press-molding apparatus. The lower air cylinder is used in cooling process after press-molding process for pushing the lower molds 101 upward to apply pressure to the products, to prevent deformation of the products.

Further, the lower molds 101 respectively have a sensor (not shown) for measuring the temperature around the lens-surface forming surface and a cooling pipe (not shown) comprising an N2 pipe (not shown) for passing N2 (nitrogen) gas through from an N2 supply source (not shown) for cooling the lower mold.

On the other hand, the mold body 100 in FIG. 18 has the opening 100A at the side surface. The glass materials G are fed into the mold through the opening 100A, and the products are taken from the mold through the opening 100A.

Note that the mold body 100 includes heaters (not shown) at its four corners, for heating the mold body 100, the upper molds 102 and the lower molds 101, and for heating the glass materials G via the lower and upper molds 101 and 102.

The heaters are divided into upper heaters and lower heaters, respectively connected to independent temperature adjusting mechanisms (not shown). The sensors (not shown) in the mold body detect temperature around the lens-surface forming surfaces and control the heaters.

In the mold body 100, contact members 805 and 806 of the aligning device for aligning the glass materials G are provided around the lens-surface forming surfaces of the lower molds 101. As guides for the operation of the contact members 805 and 806 on the mold body 100, grooves 811 are formed in consideration of aligning precision (the distance between the lower molds 101 and the grooves is defined) in a direction orthogonal to the axial direction of the lower molds 101. The contact members 805 and 806 of the aligning device slide in the grooves 811. The contact members 805 and 806 have tapered portions 805a and 806a at positions which directly abut against the glass materials G. Around the mold body 100, racks 807, 808 and a pinion 809 are provided via a support member 812, as a mechanism for maintaining a constant distance between the respective contact members 805 and 806 of the aligning device and the center of each lower mold 101, while maintaining the relative positions of the contact members 805 and 806. The close operation of the contact members 805 and 806 of the aligning device adjust the centers of the lower molds 101 with those of the glass materials G. Further, the drive cylinder 814 for operating the contact members 805 and 806 of the aligning device is provided in the press-molding apparatus main body, around the distal end of the rack 808. The drive cylinder 814 and the rack 808 are connected via the respective connection members 810 and 813.

Next, as the press-molding has started, the piston rod 209 of the air cylinder 210 in FIG. 1 is drawn to slide the upper molds 102 upward from the mold body 100, away from the lower molds 101. Also, the drive cylinder 814 is drawn to open the contact members 805 and 806 of the aligning device from the center of the lower molds 101. In this state, the glass materials G are placed onto the lower molds 101 by an auto hand, through the opening 100A of the mold body 100. At this time, in case of forming lenses, the glass materials G as lens blanks have a tablet-shape or a shape close to a completed lens. The glass materials G have a round shape in any way. The mold body 100, the upper molds 102 and the lower molds 101 are heated to have a temperature corresponding to a predetermined molding condition.

In FIGS. 17 and 18, the glass materials G are released from the auto hand or the like. The glass materials G are slightly shifted from the centers of the lens-surface forming surfaces of the lower molds 101 due to shifted positions of the molds with respect to the auto hand or change of attitudes of the glass materials G when released from the auto hand. Note that the viscosity of the glass materials G at this time may be $10^5$ dPa/sec (deciPascal second) or higher, not to cause serious deformation at the glass materials due to handling or aligning operation.

Next, the drive cylinder 814 is pushed forward to push the rack 808 via the connection members 813 and 814. Then, the contact member 806 connected to the rack 808 of the aligning device is moved toward the centers of the lens-surface forming surfaces of the lower molds 101. At the same time, the pinion 809 rotates by the movement of the rack 808, thus pulling back the rack 807, in the direction opposite to the moving direction of the rack 808. The contact member 805 of the aligning device, connected to the rack 807 is moved toward the centers of the lens-surface forming surfaces of the lower molds 101. In this way, the contact members 805 and 806 move relative to one another, with a reference portion of the molds 101 serving as a central position of movement and a constant distance being maintained between the contact members and the reference position.

Consequently, the tapered portions 805a and 806a of the contact members 805 and 806 come into contact with the circumferential portions of the glass materials G shifted at this time. Thus, the glass materials G are held by the tapered portions 805a and 806a and finally aligned, as shown in FIG. 19. As the operation of the contact members 805 and 806 of the aligning device stops, the alignment between the glass materials G and the lower molds 101 is completed. Note that even if there is a certain variation in sizes of the glass materials G, the tapered portions 805a and 806a of the contact members 805 and 806 of the aligning device enables precise alignment.

To prevent deformation of the glass material G in the middle of heating, the pressure applied to the glass materials G from the tapered portions 805a and 806a of the contact members 805 and 806 of the aligning device is zero. Further, to prevent shifting of the glass materials G due to vibration to the molds, immediately before the press-molding, the pressing force of the drive cylinder 814 is released or the drive cylinder 814 is slightly drawn. In this state, the upper molds 102, the lower molds 101 and the glass materials G are heated, and after the temperature of the respective parts reaches a predetermined value, the piston rods of the upper and lower air cylinders (not shown) are pushed to bring the lens-surface forming surfaces of the upper molds 102 into contact with the upper surfaces of the glass materials G, thus applying pressure on the glass materials G.

At this time, the drive cylinder 814 is drawn back when or immediately before the lens-surface forming surfaces of the upper molds 102 come into contact with the upper surfaces of the glass materials G, to return the contact members 805 and 806 of the aligning device to positions away from the centers of the lens-surface forming surfaces of the lower molds 101 in advance. Note that it can be arranged such that the side positions of the contact members 805 and 806 correspond to the measurements of the products after press-molding or to sizes a little larger than the products' measurements, so as to prevent shifting of the products when they are picked up by the auto hand or the like, and to perform smooth handling of the products. As the upper molds 102 are moved downward to press the glass materials G, the glass materials G are gradually squashed flat, deformed into product shapes such as lenses, along the lens-surface forming surfaces of the upper and lower molds, and the press-molding operation is completed. In this state, the glass materials G have optical-functional surfaces as their upper and rear surfaces, transferred from the lens-surface forming surfaces of the upper molds 102 and lower molds 101, and have a desired thickness.

Thereafter, the products are cooled down. At this time, the upper molds 102 and the lower molds 101 are cooled by the N2 gas supplied to the cooling pipes through the respective N2 pipes (not shown). At this cooling step, to prevent deformation of the products, the lower piston rod (not shown) is operated to push the lower molds upward, to apply pressure to the products. When the respective temperature of these parts and products is lowered to a predetermined value, the lower air cylinder (not shown) is drawn back, to release the pressure on the lower molds 101, and the upper molds 102 move upward. The products are taken out by the auto hand with the opening 100A of the mold body 100. Note that upon movement of the upper molds 102, if the products are shifted and cannot be taken by the auto hand, the contact members 805 and 806 may be again operated to align the products to be taken out.

This series of operations obtains products.

Next, further detailed specification of the press-molding will be described.

In this example, double-concave sided lenses having an exterior diameter of $\phi$ 15 mm, an interior diameter of $\phi$ 30 mm, a thickness of 1.5 m are formed from heavy crown glass Tg (glass transition point: 550° C.) as the materials G, by using cemented carbide molds, under the following conditions:

| (Press-Molding) | |
| --- | --- |
| Number of molds: | 4 |
| Feeding step | Feed material at 500° C. (of upper molds 102 and lower molds 101) |
| Aligning step | Initial temperature: 500° C. ($10^{16}$ dPa/sec) |
| Pressing step | 620° C. (of upper molds 102 and lower molds 101) Pressure P1 = 3100N |
| Cooling step | Cooling speed = −1.0° C./sec. Pressure P2 = 2200N Start P2 at 600° C. (of upper molds 102 or lower molds 101) End P2 at 500° C. (of upper molds 102 or lower molds 101) |
| Open molds | 480° C. (of upper molds 102 or lower molds 101) |

As shown in FIGS. 17 and 18, first, when the temperature of the upper molds 102 and the lower molds 101 is 500° C., the glass materials G of a tablet shape, with 0.2 mm variation in the diameters, are placed on the lower molds 101 and aligned with the glass materials G by operating the contact members 805 and 806 of the aligning device for 2 seconds. Then, the pressure of the drive cylinder 814 is released and the cylinder is slightly drawn back, and in this state, the temperature of the upper molds 102 and the lower molds 101 is increased to 620° C.

The glass materials G are heated by the heaters (not shown) and when the temperature of the materials has increased to a predetermined value, the contact members 805 and 806 of the aligning device are pulled back to the side positions. Then, the products are taken out through the pressing step and the cooling step. This press-molding is performed for 100 shots, and 400 products are obtained. The shift amount of the products is within an allowable range of 0.2 mm, and no poor product is found.

Note that at the feeding step, if press-molding is performed for 100 shots, on the same conditions except that the contact members 805 and 806 are not operated, the shift amount of the products increases up to 1.0 mm, and 50% of the products are poor.

As described above, the operation of the contact members 805 and 806 enables the production of excellent optical devices without producing poor products due to shifting of positions.

In the above example, the mold body 100 is comprised of a heat-resistance sintered alloy mainly containing tungsten (W). When the same material is used in the contact members 805 and 806, the racks 807 and 808 and the pinion 809 of the aligning device, as constituents of aligning structure, even if they are incorporated into the apparatus, adjusted to room temperature, and used in the above temperature conditions, the variation in measurements due to thermal expansion never occurs and desired alignment can be made. If stainless-steel (SUS303) is used as the constituent of the aligning structure, gnawing at the members occurs in several spots, depending on the above temperature conditions, and the operation of aligning becomes poor. However, if heat-resistant sintered alloy mainly containing tungsten (W) is used in the place of stainless-steel, excellent alignment can be performed over 5000 times in the above temperature conditions, without poor aligning operation.

According to the first embodiment,

① The products are concave lenses, however, the shape of the products is not limited to the concave lenses; for example, convex lenses and prisms can be produced. That is, any other shape of material that requires precise alignment can be used.

② The number of the molds is not limited to four.

③ The material of the members of the aligning structure is not limited to the heat-resistant sintered alloy mainly containing tungsten (W). Any other material such as nickel alloy or boride cermet (metal ceramic) can be used if it is heat resistant and has a thermal expansion rate which is approximately the same as that of the material of the molds.

Figure 20:
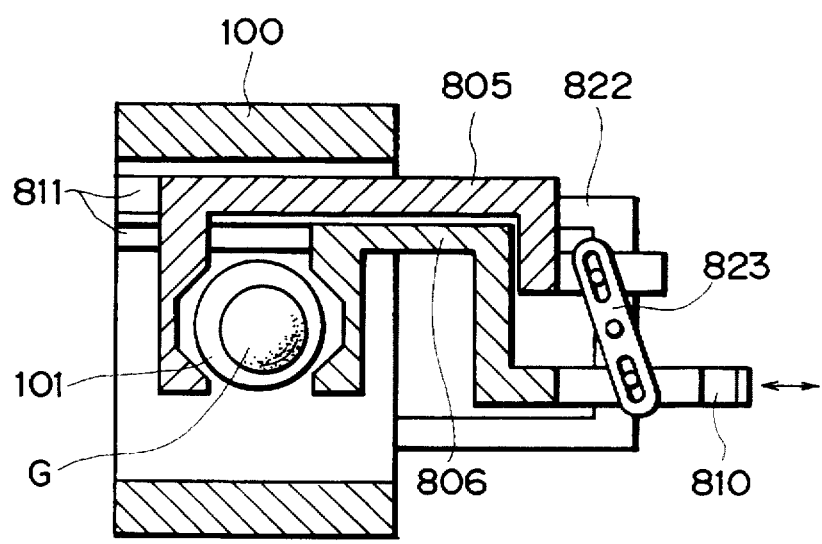
FIG. 20 is a plan view showing the aligning device according to a modification of the first embodiment.
Figure 21:
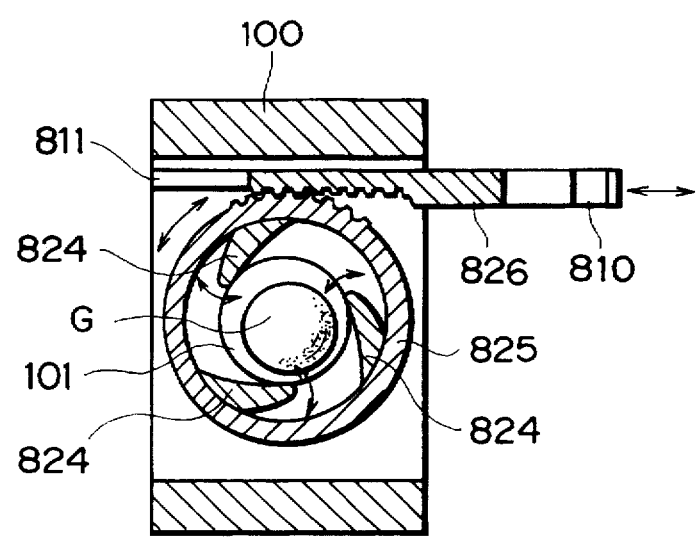
FIG. 21 is a plan view showing the aligning device according to another modification of the first embodiment.

④ The rack and pinion mechanism is employed for maintaining the distance between the contact members 805, 806 and the respective lower molds 101. However, as shown in FIG. 20, a link mechanism 822, 823 may be used. Further, the contact members are not necessarily two parts. For example, as shown in FIG. 21, alignment of the optical material G is performed by three or more ring mechanism contact members 824. The ring mechanism contact members 824 are adjusted by a rack-and-pinion mechanism to abut against the optical material G. The rack-and-pinion mechanism 826 includes a ring 825 connected by gear teeth to a rack 826. The contact members 824 move relative to one another with respect to the lower mold 101 so that the distance between the center of the lower mold 101 and the contact members 824 is constant.

⑤ The alignment is performed on glass materials used to form glass lenses, however, the material is not limited to glass; the alignment is performed for press-molding of optical devices, so far as the material requires precise alignment. For example, the alignment can be performed for press-molding of plastic material(s).

(Modification of First Embodiment)

Figure 22:
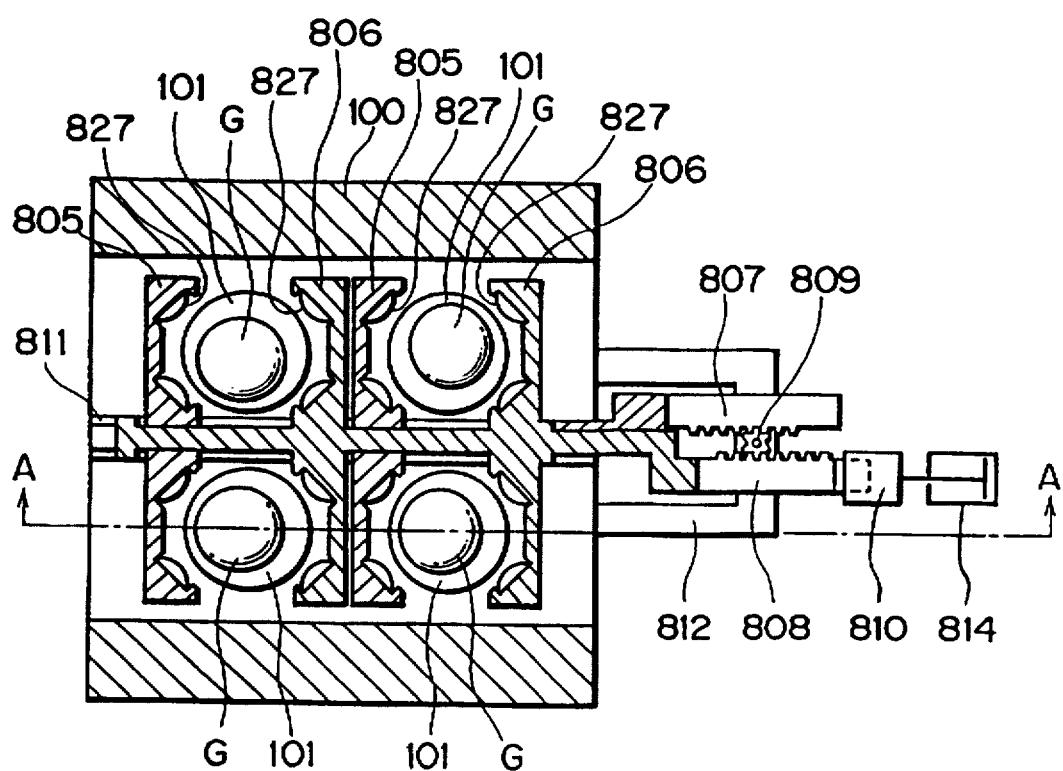
FIG. 22 is a plan view showing the aligning device according to another modification of the first embodiment.

FIG. 22 shows a modification of the contact members 805 and 806 of the aligning devices shown in FIGS. 17 to 19.

In this modification, the four glass materials can be respectively aligned even if there is variation in measurements of the glass materials. When the largest material is aligned, the smaller materials cannot be precisely aligned because gaps occur between the smaller materials and the contact members. To avoid this inconvenience, the modification has springs to bring the contact members into contact with the smaller materials.

As shown in FIG. 22, spring members 827 comprised of a ceramic material such as zirconia are provided at contact positions where the contact members 805 and 806 abut against the glass materials. The spring members 827 are also provided for the purpose of avoiding pressure load on the glass materials from the cylinder, upon alignment of the materials by the movement of the contact members 805 and 806, by the operation of the cylinder 814 and the rack-and-pinion mechanism.

(Second Embodiment)

Figure 23:
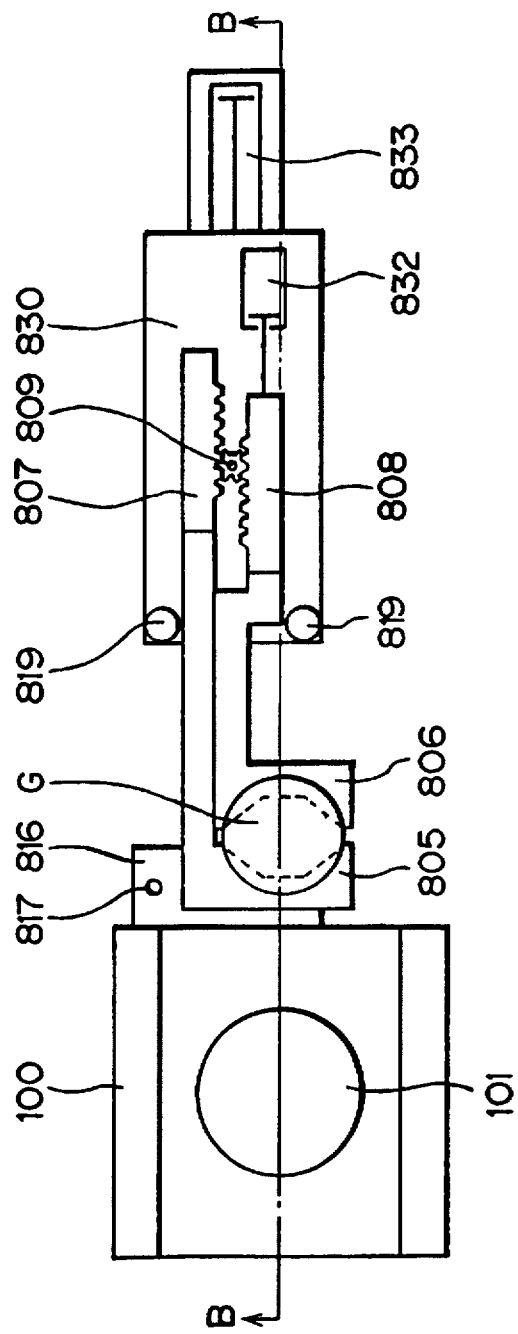
FIG. 23 is a plan view showing the mold device and the aligning device according to a second embodiment of the present invention, where alignment is performed.
Figure 24:
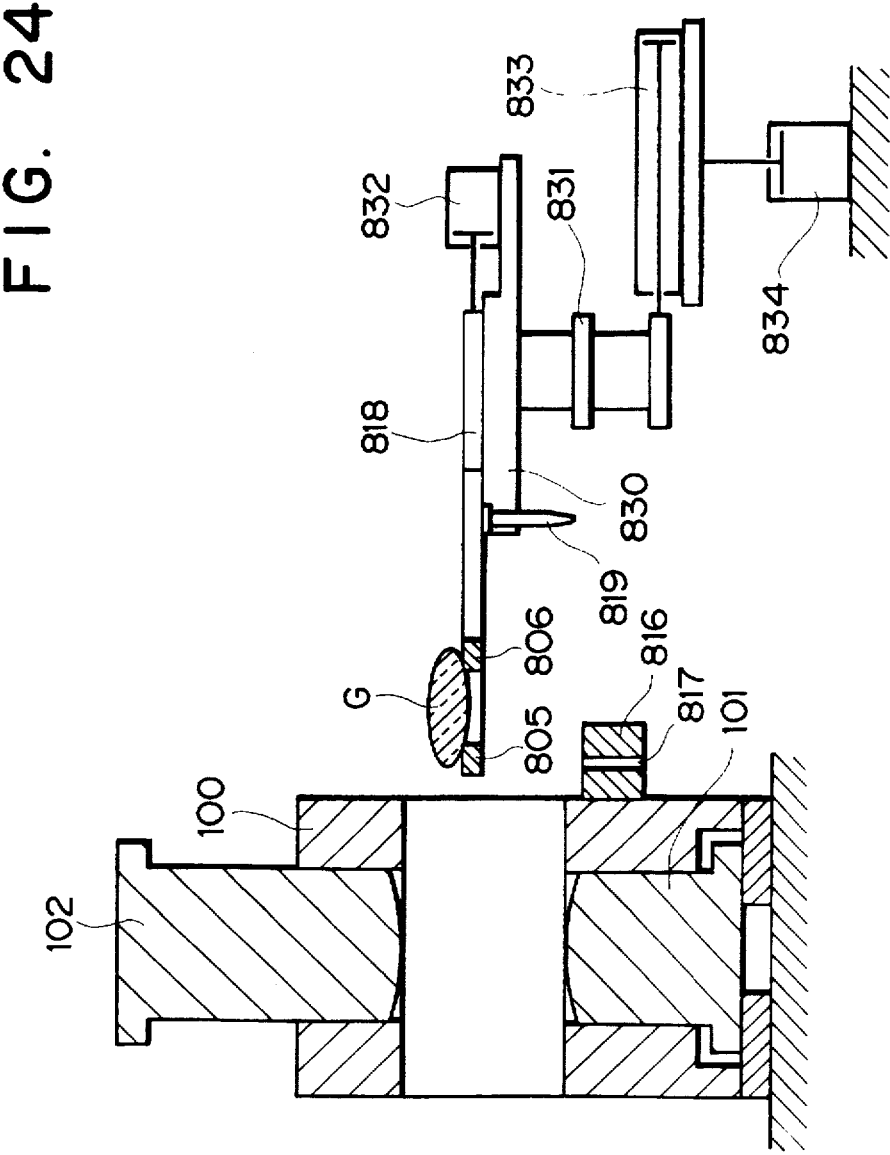
FIG. 24 is a cross-sectional view cut along a line B—B in FIG. 23.

FIGS. 23 and 24 schematically show the structure of the mold device and aligning device and an aligning procedure at contact position of the aligning device, according to the second embodiment. The structure of the mold device is similar to that of the first embodiment except that it has one set of upper and lower molds and the contact members 805 and 806 of the aligning device are not fixed to the mold body 100, therefore a detailed explanation of the structure of these devices will be omitted.

Next, the procedure for aligning the glass material G with the lower mold 101 of this mold device will be described. In FIG. 23, the glass material G is fed into the mold by the contact members 805 and 806 of an aligning device 818. The aligning device 818 moves freely in and out of the mold by means of cylinders which move the aligning device 818 horizontally 832, 833 and vertically 834. In addition, a shaft 831 rotates the aligning device 818, and a support 830 is provided for the aligning device 818. The contact members 805 and 806 are closed by a mechanism similar to that of the first embodiment, e.g., a rack-and-pinion mechanism, and the glass material G is placed on the contact members 805 and 806. Note that the glass material G may be put between the contact members 805 and 806. Note that the glass material G may be put between the contact members 905 and 806.

Figure 25:
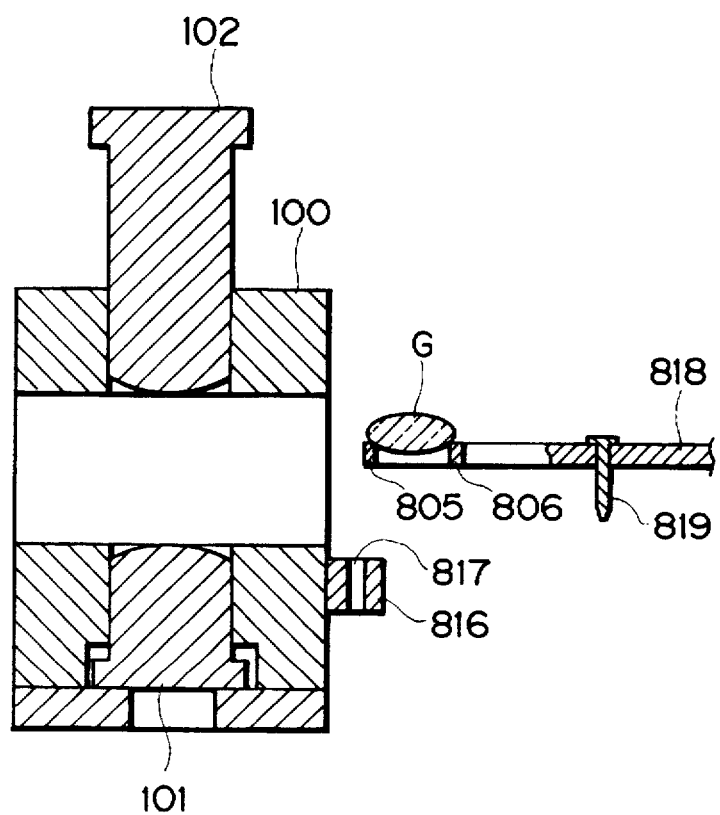
FIGS. 25 to 27 are cross-sectional view respectively explaining the operation of the aligning device of the second embodiment.
Figure 26:
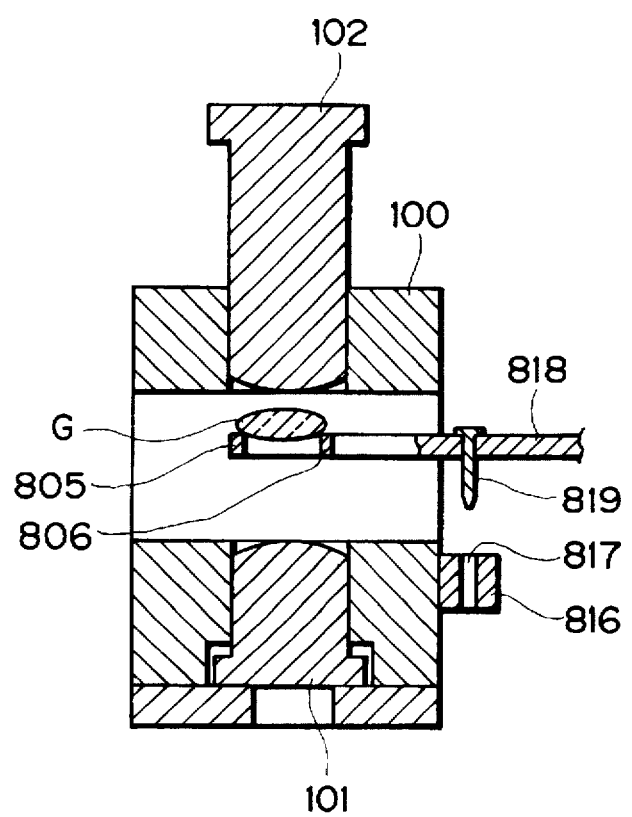
Figure 27:
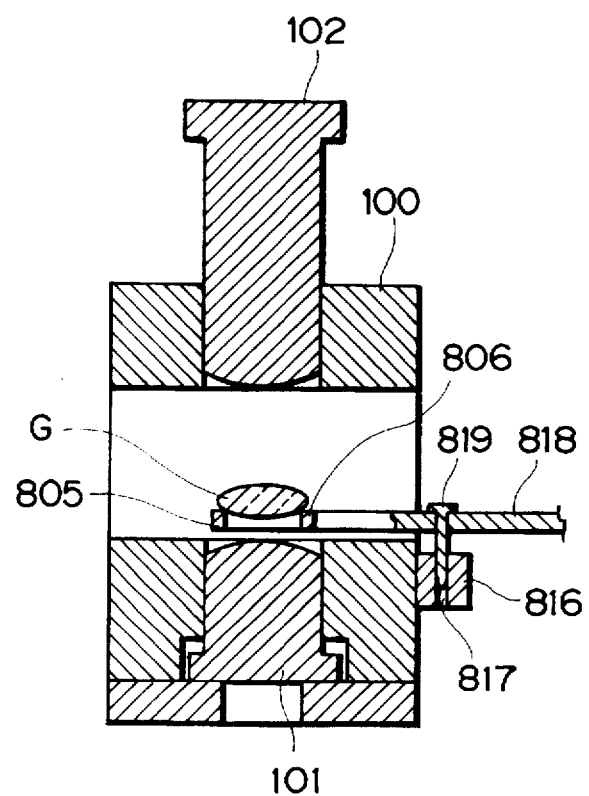

Next, as shown in FIGS. 25 to 27, the aligning device 818 on which the glass material G is placed is inserted into the mold by a driving power source (not shown). The aligning device 818 is moved downward, and an aligning pin 819 provided at the aligning device 818 is inserted into an aligning hole 817 in an aligning block 816 fixed to the mold body 100, thus completing alignment of the lower mold 101 with the aligning device 818.

Next, the contact members 805 and 806 of the aligning device 818 are opened, and the glass material G is placed onto the lower mold 101. Then, the contact members 805 and 806 of the aligning device 818 are closed, thus completing alignment of the glass material G with the lower mold 101. Thereafter, press-molding is performed. As the press-molding is similar to that in the first embodiment, the explanation of the press-molding will be omitted. Note that it can be arranged such that the aligning device 818 remain within the mold after the alignment of the glass material G so as to hold the glass material G immediately before press-molding, similar to the first embodiment.

Next, further detailed specification of the press-molding will be described.

In this example, a meniscus lens having an exterior diameter of φ 22 mm, a curvature (R) of an upper concavity of 30 mm, a curvature (R) of a rear convexity of about 110 mm (aspherical), a central thickness of 1.8 mm is formed from heavy crown glass Tg (glass transition point: 550° C.) as the glass material, by using a cemented carbide mold, under the following conditions:

| Aligning step | Initial temperature: 500° C. ($10^{16}$ dPa/sec) |
|---|---|
| Pressing step | 630° C. (of upper mold 102 and lower mold 101) |
| | Pressure P1 = 4900N |
| Cooling step | Cooling speed = −1.0° C./sec. |
| | Pressure P2 = 3900N |
| | P2 start at 600° C. (of upper mold 102 or lower mold 101) |
| | P2 end at 500° C. (of upper mold 102 or lower mold 101) |

| | |
|---|---|
| Open molds | 480° C. (of upper mold 102 or lower mold 101) |

As shown in FIGS. 25 to 27, first, when the temperature of the upper mold 102 and the lower mold 101 is 500° C., the glass material G of a tablet shape, with 0.2 mm variation in the diameter, is placed on the lower mold 101 and aligned with the lower mold 101 by operating the contact members 805 and 806 of the aligning device 818 for 2 seconds. Then, the aligning device 818 is drawn out of the mold. In this state, the temperature of the upper mold 102 and the lower mold 101 is increased to 630° C., and the glass material G is heated by a heater (not shown) until the temperature of the material has increased to a predetermined value. Then, the product is taken out through the pressing step and the cooling step. This press-molding is performed for 200 shots, and the shift amount of the products is within an allowable range of 0.3 mm, and no poor product is found.

(Third Embodiment)

Next, an example of press-molding of molten glass to obtain a lens blank as a preform having close shape to a final lens shape, to which the present invention is applied will be described.

Figure 28:
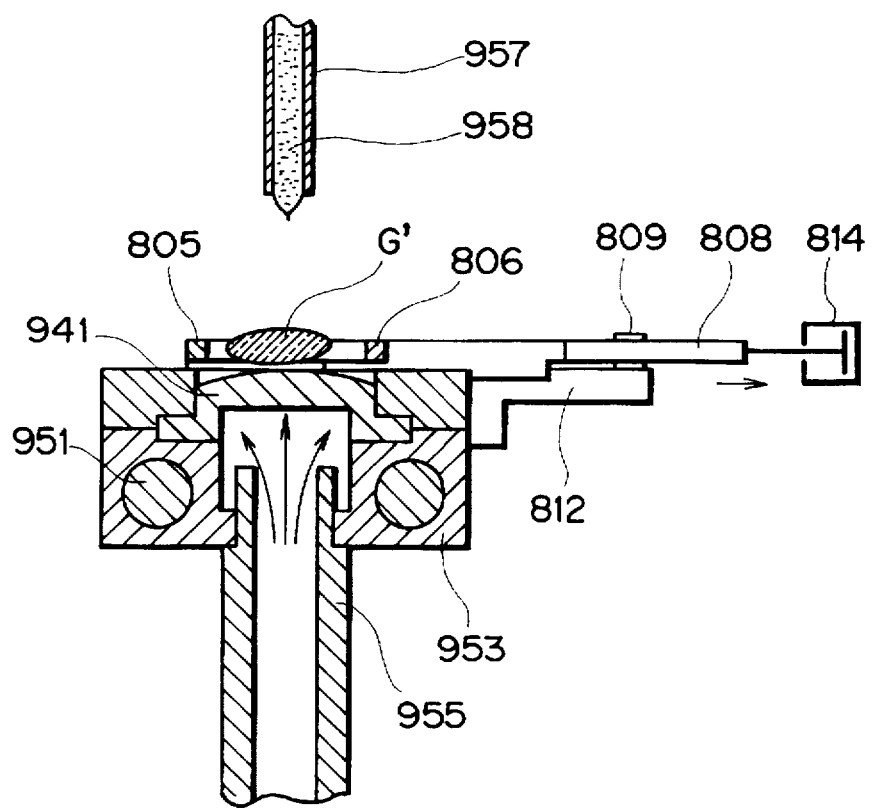
FIGS. 28 to 30 are cross-sectional views showing the structure of a mold device and the aligning device for forming a lens blank and a procedure of the formation of the lens blank, according to a third embodiment of the present invention.
Figure 29:
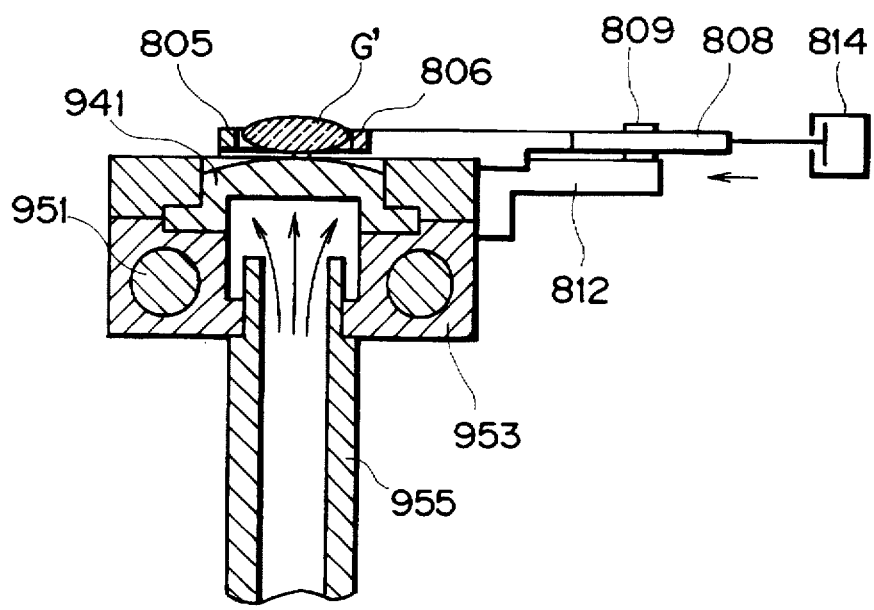
Figure 30:
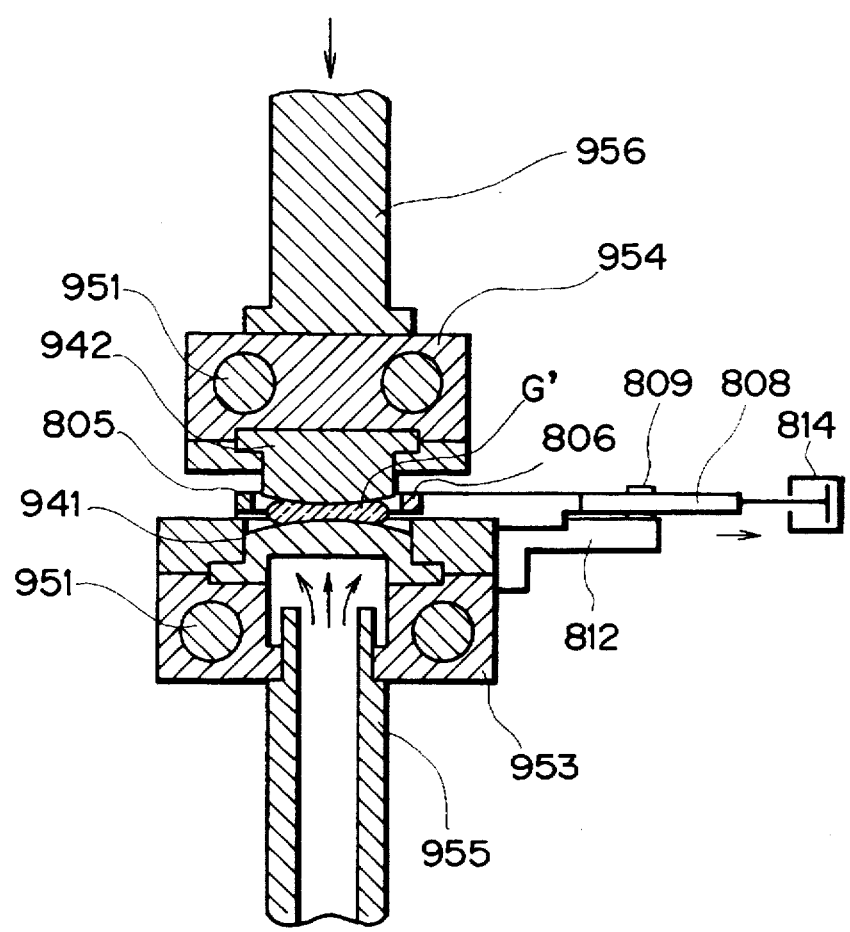

FIGS. 28 to 30 show the structure of the mold device and aligning device according to the a third embodiment of the present invention and procedure of alignment and press-molding. FIG. 28 shows a state where molten glass is placed on the lower mold; FIG. 29, a state where the molten glass is aligned with the lower mold; and FIG. 30, a state where the molten glass is pressed to be a lens blank.

In FIGS. 28 to 30, a lower mold 941 having an internal heater 951 is aligned and held on a lower mold block 953 which is temperature-controlled by a sensor (not shown). On the lower mold block 953, the contact members 805 and 806 of the aligning device, connected to the drive cylinder 814, are aligned with the lower mold block 953 via the support member 812. At contact positions where the contact members 805 and 806 abut against the glass material (G'), materials such as carbon are employed. The lower mold block 953 moves horizontally between a material-supply pipe 957 and an upper mold 942 by a cylinder (not shown). Also the lower mold block 953 is connected to a support pipe 955 which is movable in the vertical direction. Note that the support pipe 955 is provided so as to supply gas of controlled temperature and amount, from a gas supply source (not shown), to the rear surface of the lower mold 941. As the material of the lower mold 941 is porous material, the supplied gas is spouted out to the surface of the lower mold 941. The upper mold 942 is aligned with an upper mold block 954 so as to be aligned with respect to the lower mold 941 upon pressing a glass G' on the lower mold 941. Similar to the lower mold block 953, the upper mold block 954 has the internal heater 951 and is temperature-controlled by a sensor (not shown). Further, a press shaft 956 connected to a press cylinder (not shown) is fixed on the upper surface of the upper mold block 954.

Next, a procedure of aligning molten glass 958 with the lower mold 941 and forming a lens blank by the mold device having the above structure will be described below.

In FIGS. 28 to 30, first, the support pipe 955 is moved to the position exactly below a material-supply pipe 957, and moved upward. At this time, gas is supplied from a gas supply source (not shown) and spouted to the surface of the lower mold 941. In this state, a predetermined amount of molten glass 958 supplied from the material-supply pipe 957 is received at the lower mold 941, then the support pipe 955 is moved downward, and is moved horizontally to move the lower mold 941 to a position exactly below the upper mold 942. At this time, the molten glass 958 is floated from the lower mold 941 by the gas to a certain degree. Then, the drive cylinder 814 is operated to perform aligning operation, prior to press-molding. The operation of the drive cylinder 814 is the same as that of the first embodiment, therefore, the explanation of this operation will be omitted. Note that the alignment is made immediately before press-molding, similar to the first embodiment, and the pressing force of the drive cylinder 814 is released, or the drive cylinder 814 is slightly drawn back. When the floating glass G' has come into contact with both the upper mold 942 and the lower mold 941, the drive cylinder 814 is drawn back, and the contact members 805 and 806 of the aligning device are pulled to side positions.

Next, further detailed specification of the press-molding will be described.

In this example, a lens blank (preform) of a double-concave sided lens having an exterior diameter of $\phi$ 15 mm, a curvature (R) of the both surfaces of 30 mm, a central thickness of 1.5 mm is formed from heavy crown glass Tg (glass transition point: 560° C.) by using a ceramic mold (using porous material as the lower mold), and using nitrogen gas to be supplied to the lower mold, on the following conditions:

| | |
|---|---|
| Melting glass-supply temperature | 1100° C. (glass viscosity of $10^{1.8}$ dPa/sec) |
| Temperature of molds and gas at alignment and beginning of press-molding | 700° C. (glass viscosity of $10^{5.4}$ dPa/sec) |
| Amount of gas at alignment and beginning of press-molding | 20 l/min |
| Temperature of mold and gas at take out of product | 515° C. (glass viscosity of $10^{12}$ dPa/sec) |
| Amount of gas at take out of product | Cooling 10 l/min |

The press-molding is performed for 100 shots, and the shift amount of the products is within an allowable range of 0.3 mm. Similar to the first embodiment, alignment can be performed without bringing the aligning device into contact with the glass material. As the molten gas G' is floated by the N2 gas and contact resistance with the lower mold 941 is removed, aligning movement can be easily made. Thus, excellent lens blank can be obtained without significantly deforming the glass material G'.

Further, the obtained lens blank can be used for press-molding lenses similarly to the first embodiment, and excellent products can be obtained without producing poor product due to shifting of positions.

As described above, the embodiments of the present invention provide a method for forming optical device(s) by pressing glass material(s) in heat-softened state, using pair (s) of upper and lower mold(s), cooling the material(s) and the molds, and taking out the product(s) from the molds. Upon placing the glass material(s) onto the lower mold(s), alignment between the glass material(s) and the lower mold(s) is performed by direct contact by contact members of an aligning device with the material(s). As the alignment between the lower mold(s) and the glass material(s) is performed by the direct contact by the contact members of the aligning device, that operate within a mold body, even if there is variation in measurements of the glass material(s), precise alignment is always possible. Further, the alignment that is performed at the final step of feeding the material(s), ensures press-molding of reliably aligned material, and further allows comparatively rough handling of material(s) before feeding the material(s) into the mold(s). Accordingly, the product(s) can be formed at lower costs. In this manner, the present invention provides an effective method that enables easy handling of material(s) upon feeding the material(s) into the mold(s), prevents formation of poor product(s) due to shifted position, and enables stable automated product take-out operation by preventing shifting of press position.

Further, the contact members of the aligning device, that abut against the material(s), constituted with a plurality of parts, can operate for alignment while respectively maintaining a constant distance from the center of an aligning position. This provides a means to always perform precise alignment, even if there is variation to a certain degree in measurements of materials. In addition, as this aligning device can handle material(s) having a size larger than a predetermined size to a certain degree, the variation in measurements of materials can be absorbed. This further enables the use of the aligning device even when the material(s) is exchanged with one of a in somewhat different size, without changing the aligning device.

Further, the aligning device is fixed to the mold device in advance as a part of the mold device, after the alignment between the aligning device and the mold(s) has been performed. In comparison with alignment using an aligning pin or the like, this arrangement can omit engagement clearance for the aligning pin, thus attains more precise alignment, and attains more reliable alignment because there is no fear of gnawing at the pin. Accordingly, alignment with high precision can be realized. As the aligning device has a connection member with respect to its driving source, the mold(s) integrally provided with the aligning device can be easily detach from the mold device. This improves simplicity of mold exchange and maintainability of the apparatus, and further improves automated mold exchange.

Further, the aligning device, separately provided from the mold device, is moved close to the mold device, and after alignment with the mold(s), the aligning device performs alignment of the material(s) with the mold(s). This enables precise alignment of the material(s) with the mold(s) even in case of using separate aligning and mold devices. In comparison with the press-molding apparatus integrally having the mold device and aligning device, the aligning precision is somewhat lowered, however, instead of using a plurality of aligning devices, the press-molding apparatus can use only one aligning device, thus performs alignment between the material(s) and the mold(s) economically.

Further, the operating-positional relation between the plural contact members of the aligning device can be defined by a rack-and-pinion mechanism, a link mechanism or a wring mechanism having a wring value, the contact members can operate while maintaining the respective distances from the contact members to the center of aligning position equal. This enables alignment of materials with variation in sizes with the mold(s) with high precision, with a very compact structure. Accordingly, the contact members of the aligning device can be easily incorporated into the mold device or the handling member, for higher aligning precision.

Further, after the material(s) is aligned with the mold(s), the pressure from the contact members of the aligning device applied to the material(s) is reduced to substantially zero, otherwise the contact members are drawn away from the material(s) a little, holding the material(s) immediately before press-molding. This enables alignment of the heat-softened material(s) before the press-molding, without ill-influencing the material(s) and causing deformation, and further the contact members enables to hold the material(s) unstably placed on the mold(s) immediately before the press-molding. Accordingly, the alignment of the material(s) within the mold(s)/the upper and lower mold, and the holding of the material(s) immediately before press-molding obtains product(s) without shifting of press position.

Since the aligning device is comprised of heat-resistant material, it withstands repeating the operation within the high-temperature mold device. Further, as the aligning device is comprised of material having approximately the same thermal-expansion rate as that of the material of the mold(s), by adjusting the positional relation between the mold(s) and the aligning device at room temperature in advance, heating at the press-molding step never causes shifting of positions due to different thermal-expansion rates. This enables alignment with high precision with easy position adjustment of the aligning device with the molds.

Further, as the glass viscosity of the material(s) upon alignment is $10^5$ dPa/sec. alignment can be performed without significantly deforming the glass material by contact with the contact members of the aligning device.

The present invention can be applied to a system constituted by a plurality of devices or to an apparatus comprising a single device.

Furthermore, the invention is also applicable to a case where the invention is embodied by supplying a program to a system or apparatus. In this case, a storage medium, storing a program according to the invention, constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. An optical-device forming method for forming an optical device of a desired shape by pressing a heat-softened optical material using a set of molds, comprising the steps of:

aligning a pair of aligning members with respect to a first mold, in which the aligning members move relatively to each other, with a reference position of the first mold as a central position of movement, so as to maintain a constant distance between the aligning members and the reference position of the first mold; and abutting the optical material with the pair of aligning members to align the optical material at a predetermined position within the first mold.

2. The optical-device forming method according to claim 1, wherein the aligning members have sloped surfaces in symmetrical shapes with respect to the reference position of the first mold, and the sloped surfaces abut against the optical material for the aligning of the optical material.

3. The optical-device forming method according to claim 1, wherein after the aligning members have aligned the optical material, further comprising the step of holding the optical material at an aligned position, in a state where pressure on the optical material by abutting against the aligning members is released and pressure applied to the optical material is substantially removed, immediately before pressing with the set of molds.

4. The optical-device forming method of claim 1, wherein after the aligning members have aligned the optical material, further comprising the step of holding the optical material at an aligned position, in a state where the aligning members are slightly drawn away from the optical material, immediately before pressing with the set of molds.

5. The optical-device forming method according to claim 1, wherein the aligning members are driven by a rack-and-pinion mechanism.

6. The optical-device forming method according to claim 1, wherein the aligning members are driven by a link mechanism.

7. The optical-device forming method according to claim 1, wherein the optical material is glass.

8. The optical-device forming method according to claim 1, wherein viscosity of the optical material upon alignment is $10^5$ dPa/sec.

9. The optical-device forming method according to claim 1, wherein the aligning members are comprised of a heat-resistant material having substantially the same thermal expansion rate as that of the material of the set of molds.

10. An optical-device forming method for forming an optical device of a desired shape by pressing a heat-softened optical material using a set of molds, comprising the steps of:
   aligning the optical material with respect to a first mold by moving the optical material within the first mold to a predetermined position by abutting aligning members against the optical material; and
   using at least three aligning members for aligning the optical material, in which the aligning members have been aligned with respect to the first mold and which move around a reference position of the first mold as a central position of movement, relatively to each other, so as to maintain a constant distance between the aligning members and the reference position of the first mold.

11. The optical-device forming method according to claim 1, wherein the aligning members are driven by a rack-and-pinion mechanism.

12. The optical-device forming method according to claim 10, wherein the aligning members are comprised of a heat-resistant material having substantially the same thermal expansion rate as that of the material of the set of molds.

13. An optical-device forming method for forming an optical device of a desired shape by pressing a heat-softened optical material using a set of molds, comprising the steps of:
   aligning the optical material with respect to a first mold by moving the optical material within the first mold to a predetermined position by abutting against the optical material; and
   wherein the aligning comprises the step of inserting an aligning pin into an aligning hole which has been aligned with respect to the first mold in advance of inputting the optical material into the first mold.

14. An optical-device forming method for forming a concave optical-functional surface on at least one surface of an optical material by pressing the optical material, being heat softened, using a set of molds, with a first mold having a convex molding surface and a second mold having a molding surface, comprising the steps of:
   placing the optical material on the first mold;
   aligning the optical material with respect to the first mold by moving the optical material within the first mold to a predetermined position by abutting the optical material with a pair of aligning members which have been aligned with respect to the first mold and which move relatively to each other, with a reference position of the first mold as a central position of movement, so as to maintain a constant distance between the aligning members and the reference position of the first mold; and
   pressing the optical material with the set of molds to form the concave optical-functional surface on at least one surface of the optical material.

15. The optical-device forming method according to claim 14, wherein the aligning members have sloped surfaces in symmetrical shapes with respect to the reference position of the first mold, and the sloped surfaces abut against the optical material for the aligning of the optical material.

16. The optical-device forming method according to claim 14, wherein after the aligning has been completed, further comprising the step of holding the optical material at an aligned position, in a state where pressure on the optical material by abutting against the aligning members is released and pressure applied to the optical material is substantially removed, immediately before pressing with the set of molds.

17. The optical-device forming method of claim 14, wherein after the aligning has been completed, further comprising the step of holding the optical material at an aligned position, in a state where the aligning members are slightly drawn away from the optical material, immediately before pressing with the set of molds.

18. The optical-device forming method according to claim 14, wherein the aligning members are driven by a rack-and-pinion mechanism.

19. The optical-device forming method according to claim 14, wherein the aligning members are driven by a link mechanism.

20. The optical-device forming method according to claim 14, wherein the optical material is glass.

21. The optical-device forming method according to claim 14, wherein viscosity of the optical material upon alignment is $10^5$ dPa/sec.

22. The optical-device forming method according to claim 14, wherein the aligning members are comprised of a heat-resistant material having substantially the same thermal expansion rate as that of the material of the set of molds.

23. An optical-device forming method for forming a concave optical-functional surface on at least one surface of an optical material by pressing the optical material, being heat softened, using a set of molds, with a first mold having a convex molding surface and a second mold having a molding surface, comprising the steps of:
   placing the optical material on the first mold;
   aligning the optical material with respect to the first mold by moving the optical material within the first mold to a predetermined position by abutting the optical material with at least three aligning members which have been aligned with respect to the first mold and which move relatively to each other, with a reference position of the first mold as a central position of movement, so as to maintain a constant distance between the aligning members and the reference position of the first mold; and
   pressing the optical material with the set of molds to form the concave optical-functional surface on at least one surface of the optical material.

24. The optical-device forming method according to claim 23, wherein the aligning members are driven by a rack-and-pinion mechanism.

25. The optical-device forming method according to claim 23, wherein the aligning members are comprised of a heat-resistant material having substantially the same thermal expansion rate as that of the material of the set of molds.

26. An optical-device forming method for forming a concave optical-functional surface on at least one surface of an optical material by pressing the optical material, being heat softened, using a set of molds, with a first mold having a convex molding surface and a second mold having a molding surface, comprising the steps of:

aligning the optical material with respect to the first mold, wherein the aligning is preformed by inserting a pin into an aligning hole which has been aligned with respect to the first mold in advance of placing the optical material on the first mold;

placing the optical material on the first mold; and pressing the optical material with the set of molds to form the concave optical-functional surface on at least one surface of the optical material.

27. An optical-device forming apparatus for forming an optical device of a desired shape by pressing a heat-softened optical material using a set of molds, comprising:

aligning means for aligning the optical material with respect to a first mold by moving the optical material within said first mold to a predetermined position by abutting against the optical material, said aligning means including a pair of aligning members aligned with respect to said first mold and which move relatively to each other, with a reference position of said first mold as a central position of movement, so as to maintain a constant distance between said aligning members and the reference position of said first mold.

28. The optical-device forming apparatus according to claim 29, wherein said aligning members have sloped surfaces in symmetrical shapes with respect to the reference position of said first mold and said sloped surfaces are abutting against the optical material.

29. The optical-device forming apparatus according to claim 27, further comprising spring means on surfaces of said aligning members so as to abut against said optical material during said aligning.

30. The optical-device forming apparatus according to claim 29, further comprising a rack-and-pinion mechanism to drive said aligning means.

31. The optical-device forming apparatus according to claim 27, further comprising a link mechanism to drive said aligning means.

32. The optical-device forming apparatus according to claim 29, wherein the optical material is glass.

33. The optical-device forming apparatus according to claim 27, wherein viscosity of the optical material upon alignment is $10^5$ dPa/sec.

34. The optical-device forming apparatus according to claim 27, wherein said aligning members are comprised of a heat-resistant material having substantially the same thermal expansion rate as that of said set of molds.

35. An optical-device forming apparatus for forming an optical device of a desired shape by pressing a heat-softened optical material using a set of molds, comprising:

aligning means for aligning the optical material with respect to a first mold by moving the optical material within said first mold to a predetermined position by abutting against the optical material, said aligning means including at least three aligning members which have been aligned with respect to said first mold and which move around a reference position of said first mold as a central position of movement, relatively to each other, so as to maintain a constant distance between said aligning members and the reference position of said first mold.

36. The optical-device forming apparatus according to claim 35, further comprising a rack-and-pinion mechanism to drive said aligning means.

37. The optical-device forming apparatus according to claim 35, wherein said aligning members are comprised of a heat-resistant material having substantially the same thermal expansion rate as that of said set of molds.

38. An optical-device forming apparatus for forming an optical device of a desired shape by pressing a heat-softened optical material using a set of molds, comprising:

molding means, including a first mold, for pressing the heat-softened optical material; and aligning means for aligning the optical material with respect to said first mold by moving the optical material within said first mold to a predetermined position, wherein said aligning means includes an aligning pin to be inserted into an aligning hole which has been aligned with respect to said first mold in advance of inputting the optical material into said first mold.

39. An optical-device forming apparatus for forming a plurality of optical devices of a desired shape by pressing a plurality of heat-softened optical materials using plural sets of molds, comprising:

molding means, including plural sets of molds, for pressing the heat-softened optical materials; and aligning means, including a pair of aligning members, for aligning the optical materials with respect to said molds, by moving the optical materials within said molds to a predetermined position by abutting said aligning members against the optical materials, with said aligning members being aligned with respect to said molds and able to move relatively to each other, with a reference position of said molds as a central position of movement, so as to maintain a constant distance between the aligning members and the reference position of said molds.

40. The optical-device forming apparatus according to claim 39, wherein said aligning members have sloped surfaces in symmetrical shapes with respect to the reference position of said molds, and said sloped surfaces are abutting against the optical materials during said aligning.

41. The optical-device forming apparatus according to claim 40, further comprising a rack-and-pinion mechanism for driving said aligning means.

42. The optical-device forming apparatus according to claim 40, wherein said aligning members are comprised of a heat-resistant material having substantially the same thermal expansion rate as that of said sets of molds.

43. The optical-device forming apparatus according to claim 39, further comprising spring means on surfaces of said aligning members so as to abut against the optical materials during said aligning.

44. The optical-device forming apparatus according to claim 39, wherein the optical materials are glass.

45. The optical-device forming apparatus according to claim 39, wherein viscosity of the optical materials upon alignment are $10^5$ dPa/sec.

46. The optical-device forming apparatus according to claim 39, wherein said aligning members are comprised of a heat-resistant material having substantially the same thermal expansion rate as that of said sets of molds.

47. An optical-device forming apparatus for forming a plurality of optical devices of a desired shape by pressing a plurality of heat-softened optical materials using plural sets of molds, comprising:

aligning means for aligning the optical materials with respect to said molds, by moving the optical materials within said molds to a predetermined position by abutting against the optical materials, said aligning means including at least three aligning members aligned with respect to said molds and which move around a reference position of said molds as a central position of movement, relatively to each other, so as to maintain a constant distance between said aligning members and the reference position of said molds.

48. An optical-device forming apparatus for forming a plurality of optical devices of a desired shape by pressing a plurality of heat-softened optical materials using plural sets of molds, comprising:

pressing means, including plural sets of molds, for molding the optical materials; and aligning means for aligning the optical materials with respect to said molds by moving the optical materials within said molds to a predetermined position by abutting against the optical materials, wherein said aligning means includes an aligning pin to be inserted into an aligning hole which has been aligned with respect to said molds in advance of inputting the optical materials into said molds.

49. An optical-device forming apparatus for forming a plurality of optical devices of a desired shape by pressing a plurality of heat-softened optical materials using plural sets of molds, comprising:

aligning means for aligning the optical materials with respect to said molds by moving the optical materials within said molds to a predetermined position by abutting against the optical materials; and a rack-and-pinion mechanism for driving said aligning means.

50. An optical-device forming apparatus for forming a plurality of optical devices of a desired shape by pressing a plurality of heat-softened optical materials using plural sets of molds, comprising:

aligning means for aligning the optical materials with respect to said molds by moving the optical materials within said molds to a predetermined position by abutting against the optical materials; and a link mechanism for driving said aligning means.

* * * * *

UNITED STATES PATENT AND TRADEMARK OFFICE
CERTIFICATE OF CORRECTION

PATENT NO. : 5,788,732

DATED : August 4, 1998

INVENTOR(S) : Nomura et al.

It is certified that error appears in the above-identified patent and that said Letters Patent is hereby corrected as shown below:

On the title page, item :

[56] REFERENCES CITED:

U.S. PATENT DOCUMENTS, "5,215,566  6/1993  Yamamoto et al."
   should read --5,215,566  1/1993  Yamamoto et al.--.
FOREIGN PATENT DOCUMENTS, "4130024  5/1992  Japan" should
   read --4-130024  5/1992  Japan--.

COLUMN 22:

Line 24, "Note that the glass" should be deleted.
Line 25, delete in its entirety.
Line 26, "806." should be deleted.

COLUMN 25:

Line 19, "in" should be deleted.

COLUMN 27:

Line 32, "1," should read --10,--.

COLUMN 29:

Line 28, "claim 29," should read --claim 27,--.
Line 37, "claim 29," should read --claim 27,--.
Line 42, "claim 29," should read --claim 27,--.

UNITED STATES PATENT AND TRADEMARK OFFICE
CERTIFICATE OF CORRECTION

PATENT NO. : 5,788,732

DATED : August 4, 1998

INVENTOR(S) : Nomura et al.

It is certified that error appears in the above-identified patent and that said Letters Patent is hereby corrected as shown below:

COLUMN 31:

Line 13, "pressing" should read --molding-- and "mold-" should read --press- --.

Signed and Sealed this

Sixth Day of July, 1999

Attest:

Q. TODD DICKINSON

*Attesting Officer*  Acting Commissioner of Patents and Trademarks